United States Patent
Miyamoto et al.

(10) Patent No.: US 10,301,461 B2
(45) Date of Patent: May 28, 2019

(54) RESIN COMPOSITION AND RESIN MOLDED ARTICLE

(71) Applicant: FUJI XEROX CO., LTD., Tokyo (JP)

(72) Inventors: Tsuyoshi Miyamoto, Minamiashigara (JP); Daisuke Nakayama, Minamiashigara (JP); Hiroyuki Moriya, Minamiashigara (JP); Masayuki Okoshi, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/641,775

(22) Filed: Jul. 5, 2017

(65) Prior Publication Data

US 2018/0179370 A1  Jun. 28, 2018

(30) Foreign Application Priority Data

Dec. 28, 2016 (JP) .................................. 2016-256003
Dec. 28, 2016 (JP) .................................. 2016-256004

(51) Int. Cl.
| | | |
|---|---|---|
| *C08L 23/12* | (2006.01) | |
| *C08L 77/06* | (2006.01) | |
| *C08L 23/06* | (2006.01) | |
| *C08L 79/08* | (2006.01) | |

(52) U.S. Cl.
CPC ............... *C08L 23/12* (2013.01); *C08L 23/06* (2013.01); *C08L 77/06* (2013.01); *C08L 79/08* (2013.01); *C08L 2205/16* (2013.01)

(58) Field of Classification Search
CPC .......... C08L 23/06; C08L 23/12; C08L 77/06; C08J 5/042
USPC ........................................... 524/495; 525/179
See application file for complete search history.

(56) References Cited

U.S. PATENT DOCUMENTS

| | | | | |
|---|---|---|---|---|
| 4,378,407 A | * | 3/1983 | Yamamoto | ............. C08G 18/34 |
| | | | | 174/110 N |
| 8,568,867 B2 | * | 10/2013 | Chan | .................. C08G 73/1007 |
| | | | | 428/323 |
| 2003/0092814 A1 | | 5/2003 | Borgner et al. | |

FOREIGN PATENT DOCUMENTS

| | | | | |
|---|---|---|---|---|
| EP | 3127958 A2 | * | 2/2017 | ............. C08L 23/00 |
| JP | 2000-071245 A | | 3/2000 | |
| JP | 2003-528956 A | | 9/2003 | |
| JP | 2014-181307 A | | 9/2014 | |

* cited by examiner

*Primary Examiner* — Fred M Teskin
(74) *Attorney, Agent, or Firm* — Oliff PLC

(57) ABSTRACT

Provided is a resin composition including: a thermoplastic resin; a carbon fiber; and a terminal modified resin including a main chain having at least one terminal modified with a long chain alkyl group having 8 or more carbon atoms, the main chain containing at least one of an amide bond and an imide bond.

31 Claims, 1 Drawing Sheet

RESIN COMPOSITION AND RESIN MOLDED ARTICLE

CROSS-REFERENCE TO RELATED APPLICATIONS

This application is based on and claims priorities under 35 USC 119 from Japanese Patent Application No. 2016-256003 filed on Dec. 28, 2016 and Japanese Patent Application No. 2016-256004 filed on Dec. 28, 2016.

BACKGROUND

Technical Field

The present invention relates to a resin composition and a resin molded article.

Related Art

Hitherto, various resin compositions have been provided and are used for various applications.

In particular, resin compositions containing a thermoplastic resin are used in various components and cases of home electronics and automobiles or in various components, for example, of cases of business machines and electric and electronic apparatuses.

SUMMARY

An object of the present invention is to provide a resin molded article obtained from a resin composition including a thermoplastic resin, a carbon fiber, and a resin including a main chain containing at least one of an amide bond and an imide bond, the resin molded article having high bending elastic modulus compared with the case where neither terminal of the main chain is modified.

According to an aspect of the invention, there is provided a resin composition including:

a thermoplastic resin;

a carbon fiber; and a terminal modified resin including a main chain having at least one terminal modified with a long chain alkyl group having 8 or more carbon atoms, the main chain containing at least one of an amide bond and an imide bond.

According to the aspect of the invention, a resin molded article having high bending elastic modulus is obtained compared with the case where neither terminal of the main chain containing at least one of an amide bond and an imide bond is modified.

BRIEF DESCRIPTION OF DRAWINGS

Exemplary embodiment(s) of the present invention will be described in detail based on the following figures, wherein.

DETAILED DESCRIPTION

Figure 1:
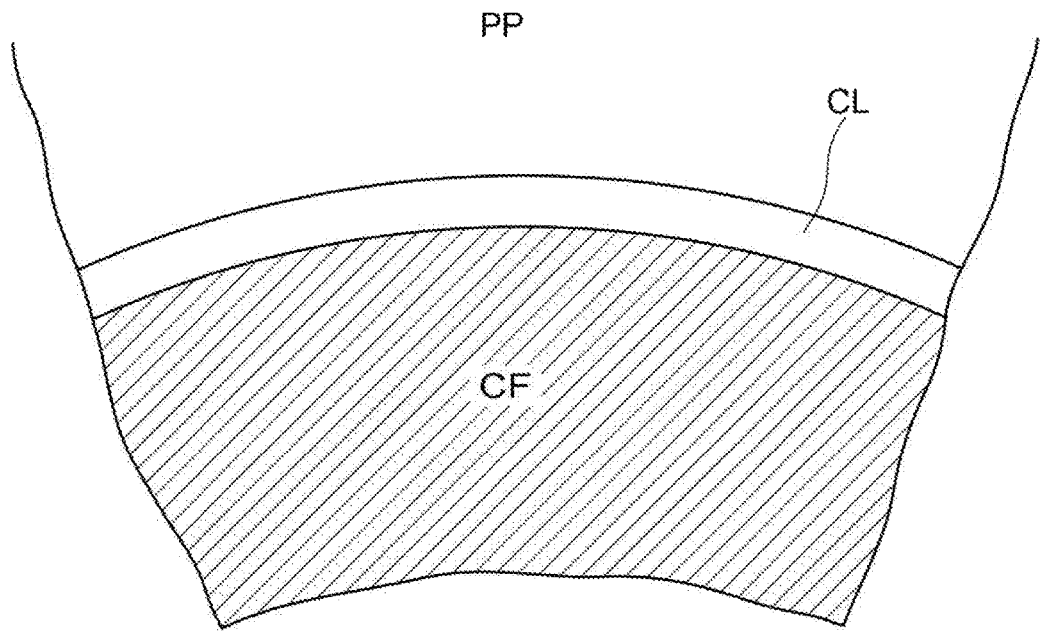
FIG. 1 is a schematic diagram for explaining one example of major parts of a resin molded article according to the exemplary embodiment.

Hereinafter, an exemplary embodiment which is an example of the resin composition and the resin molded article according to the invention will be described.

[Resin Composition]

The resin composition according to the exemplary embodiment includes a thermoplastic resin, a carbon fiber, and a terminal modified resin which contains at least one of an amide bond and an imide bond in a main chain and in which at least one terminal of the main chain is modified with a long-chain alkyl group having 8 or more carbon atoms or a sterol residue.

In the specification, the alkyl group having 8 or more carbon atoms modifying at least one terminal of the main chain in the terminal modified resin is referred to as a "long-chain alkyl group".

Further, in the specification, a "sterol residue" represents a residue of sterol (that is, a group obtained by removing a hydroxyl group (—OH) from sterol) bonded to a terminal of the resin obtained by reacting sterol (steroid alcohol) having a hydroxyl group (—OH) with a resin containing at least one of an amide bond and an imide bond in the main chain and having a functional group at the terminal.

Further, a "cholesterol residue" represents a residue of cholesterol (that is, a group obtained by removing a hydroxyl group (—OH) from cholesterol) bonded to a terminal of the resin obtained by reacting cholesterol with a resin containing at least one of an amide bond and an imide bond in the main chain and having a functional group at the terminal.

In recent years, in order to obtain a resin molded article excellent in mechanical strength, a resin composition containing a thermoplastic resin as a base material (matrix) and a reinforcing fiber is used.

In the resin composition, when affinity between the reinforcing fiber and the thermoplastic resin is low, a space is formed in an interface therebetween, and adhesion in the interface may decrease.

In particular, when a carbon fiber is used as the reinforcing fiber in the resin composition, higher mechanical strength than that of glass fiber is required.

Therefore, a decrease in the adhesion in the interface between the carbon fiber and the thermoplastic resin may cause a decrease in mechanical strength, in particular, bending elastic modulus.

In particular, when a carbon fiber is used as the reinforcing fiber in the resin composition, higher mechanical strength than that of glass fiber is required. However, since a polar group contributing to adhering to the thermoplastic resin, for example, a hydroxyl group or a carboxyl group, on a surface of the carbon fiber is less than that of a glass fiber, the adhesion in the interface between the carbon fiber and the thermoplastic resin decreases. As a result, the mechanical strength, in particular, the bending elastic modulus is hard to increase regardless of adding the carbon fiber. In particular, when a bending load is repeatedly applied, peeling in the interface between the carbon fiber and the thermoplastic resin is apt to progress and thus, the decrease in bending elastic modulus tends to increase from the beginning.

Therefore, the resin composition according to the exemplary embodiment includes three components of a thermoplastic resin, a carbon fiber, and a terminal modified resin.

By taking such a configuration, a resin molded article having high bending elastic modulus is obtained. The mechanism by which the effect is obtained is not clear but is presumed to be as follows.

When the resin composition is molten-mixed in the case of obtaining a resin molded article from the resin composition according to the exemplary embodiment, the thermoplastic resin as the base material and the terminal modified resin are compatibilized by the long-chain alkyl group or the sterol residue included in the terminal of the main chain of the terminal modified resin, and as a result, the terminal modified resin is dispersed in the resin composition.

In this state, when the terminal modified resin contacts the carbon fiber, a large number of the amide bond or the imide bond contained along the molecular chain of the terminal modified resin and a polar group slightly present on a surface of the carbon fiber are physically adhered to each other through affinity (attraction and hydrogen bond) in plural positins.

In addition, the long-chain alkyl group is easier to move than the main chain containing at least one of an amide bond and an imide bond. Therefore, the terminal long-chain alkyl group maintains the state of extending in an outside direction from the surface of carbon fiber even when the main chain is physically adhered to the surface of carbon fiber. That is, the terminal long-chain alkyl group is present in the state of orientating from the surface of carbon fiber into the thermoplastic resin as the base material.

Further, since the steroid structure is easily crystallized, the sterol residue has high crystalline property. Also, the thermoplastic resin as the base material has generally high crystalline property. Thus, the terminal sterol residue is excellent in affinity to the thermoplastic resin. Therefore, even when the main chain is physically adhered to the surface of carbon fiber, due to the affinity described above the terminal sterol residue is present in the state of orientating from the surface of carbon fiber into the thermoplastic resin as the base material.

In this way, a coating layer due to the terminal modified resin is formed around the carbon fiber (refer to FIG. 1). In FIG. 1, PP represents the thermoplastic resin, CF represents the carbon fiber, and CL represents the coating layer.

The state in which the long-chain alkyl group or the sterol residue is oriented from the terminal modified resin forming the coating layer in the outside direction (that is, into the thermoplastic resin as the base material) is formed. Since the long-chain alkyl group or the sterol residue is also compatibilized with the thermoplastic resin, an equilibrium state is formed between attraction and repulsion, and the coating layer formed using the terminal modified resin has a small thickness and is substantially uniform. In particular, since the affinity between a carboxyl group present on a surface of the carbon fiber and the amide bond or the imide bond contained in the molecule of the terminal modified resin is high, it is presumed that the coating layer using the terminal modified resin is easily formed around the carbon fiber and that the coating layer is thin and has excellent uniformity.

It is preferred that the carbon fiber is covered at its whole periphery with the coating layer, but a part of the periphery of the carbon fiber may not be covered.

It is presumed from the description above that the adhesion in the interface between the carbon fiber and the thermoplastic resin increases in the resin composition according to the exemplary embodiment and that the resin molded article having mechanical strength, in particular, high bending elastic modulus is obtained.

Further, the steroid structure acts as a nucleating material or a crystallizing material. Therefore, the resin composition including the terminal sterol modified resin having the sterol residue at the terminal is effective for shortening curing tact during the injection molding, and high throughput injection molding can be achieved.

The resin composition according to the exemplary embodiment includes three components of a thermoplastic resin, a carbon fiber, and a resin including a main chain having at least one of an amide bond and an imide bond, as a terminal modified resin. The terminal modified resin includes the main chain having at least one terminal modified with a long-chain alkyl group or a sterol residue. The resin composition including the three components described above is a resin composition for providing a resin molded article excellent in impact resistance in comparison with the case where only a terminal-unmodified polyamide is included as the resin containing the main chain having at least one of an amide bond and an imide bond. The mechanism by which the effect is obtained is not clear but is presumed to be as follows.

In order to increase elastic modulus of resin, it is usually considered that a method of firmly immobilizing molecular structure by chemical bonding of functional groups to each other contained in the resin is effective. In particular, it is considered that the elastic modulus is greatly increased by forming a large number of crosslinking points between polymer chains to form a network structure. However, when strong impact force is instantly applied to a resin having a crosslinking structure firmly bound, the crosslinking structure is destroyed in some cases. That is, it is not easy to achieve both high elastic modulus and impact resistance in a resin.

On the other hand, in the resin composition according to the exemplary embodiment, the long-chain alkyl group or the sterol residue at the terminal of the terminal modified resin is mixed (compatibilized) with the thermoplastic resin with a relatively weak bonding force. Thus, it is presumed that even against the impact instantly applied, the impact force can be spread by mitigation due to rearrangement of the internal structure so that the impact resistance is enhanced while obtaining high elastic modulus (in particular, high bending elastic modulus).

Here, the resin composition according to the exemplary embodiment and the resin molded article obtained therefrom preferably have a structure in which the coating layer using the terminal modified resin is formed around the carbon fiber through molten-kneading during the production of the resin composition (for example, pellet) and injection molding and in which the thickness of the coating layer is from 5 nm to 700 nm.

In the resin composition according to the exemplary embodiment, the thickness of the coating layer formed using the terminal modified resin is preferably from 5 nm to 700 nm and, from the standpoint of further improvement in the bending elastic modulus, it is more preferably from 10 nm to 650 nm. When the thickness of the coating layer is 5 nm or more (particularly, 10 nm or more), the bending elastic modulus is improved. When the thickness of the coating layer is 700 nm or less, the interface where the coating layer is formed between the carbon fiber and the thermoplastic resin is prevented from being embrittled, and a decrease in the bending elastic modulus is prevented.

The thickness of the coating layer is a value measured according to the following method. A measurement object is cut in liquid nitrogen, and a cross-section thereof is observed using an electron microscope (VE-9800, produced by Keyence Corp.). In the cross-section, the thickness of the coating layer which is coated around the carbon fiber is measured at 100 positions, and the average value thereof is obtained.

The confirmation of the coating layer is performed by the cross-section observation described above.

<Layer of Compatibilizer>

The resin composition (and the resin molded article thereof) according to the exemplary embodiment may have a constitution where a compatibilizer ensures partial compatibility between the coating layer and the thermoplastic resin.

Figure 2:
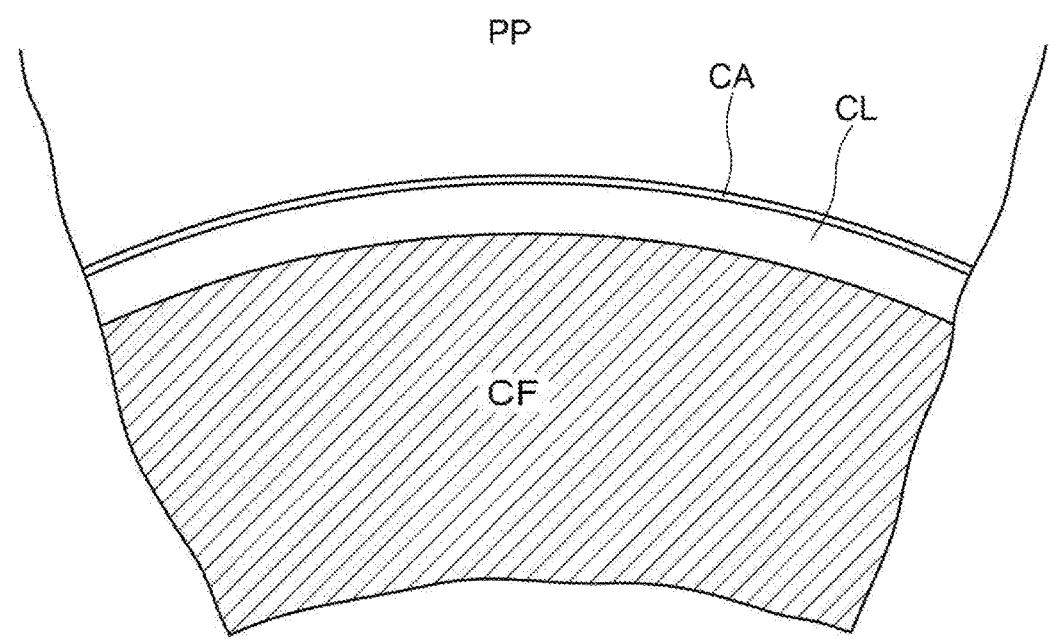
FIG. 2 is a schematic diagram for explaining another example of major parts of a resin molded article according to the exemplary embodiment.

Specifically, for example, a constitution where a layer of the compatibilizer lies between the coating layer formed by the terminal modified resin and the thermoplastic resin as the base material (see FIG. 2) may be provided. In other words, a constitution where a layer of the compatibilizer is formed on the surface of coating layer, and via the layer of the compatibilizer, the coating layer and the thermoplastic resin are adjacent to each other may be provided. Although the layer of the compatibilizer is formed into a layer thinner than the coating layer, the presence of the layer of the compatibilizer makes it possible to enhance adhesion (adhesiveness) between the coating layer and the thermoplastic resin, and thereby it becomes easy to obtain a resin molded article excellent in the mechanical strength, particularly, bending elastic modulus. In FIG. 2, PP represents a thermoplastic resin, CF represents a carbon fiber, CL represents a coating layer and CA represents a layer of compatibilizer.

In particular, it is preferred that the layer of compatibilizer lies between the coating layer and the thermoplastic resin in a state of being bonded to the coating layer (via, for example, a hydrogen bond or a covalent bond formed by reaction of functional groups between the compatibilizer and the terminal modified resin) and being compatibilized with the thermoplastic resin. This constitution is likely to be performed, for example, by applying a compatibilizer which not only has a structure same as or compatible with that of the thermoplastic resin as the base material but also contains a site capable of reacting with the functional group of the terminal modified resin described above in a portion of the molecule.

Specifically, for example, it is preferred that, in an case where a polyolefin is used as the thermoplastic resin, a polyamide in which at least one terminal of the main chain is modified with a long-chain alkyl group or a sterol residue is used as the terminal modified resin, and a maleic anhydride-modified polyolefin is used as the compatibilizer, a layer of the maleic anhydride-modified polyolefin (a layer of the compatibilizer) lies therebetween in such a manner that a carboxyl group formed by ring-opening of the maleic anhydride moieties and an amine residue in the polyamide layer (coating layer) are reacted to form a bond and the polyolefin moiety of the compatibilizer is in a state of being compatible with the polyolefin.

A method for confirming that the layer of a compatibilizer formed by the terminal modified resin modified with a long-chain alkyl group lies between the coating layer and the thermoplastic resin is described below.

An infrared spectroscopic analyzer (NICOLET 6700FT-IR, produced by Thermo Fisher Scientific, Inc.) is used as an analyzer. For example, in the case of a resin composition (or a resin molded article) containing polypropylene (abbreviated as PP hereafter) as a thermoplastic resin, terminal long-chain alkyl modified resin PA66 as a terminal modified resin and maleic acid-modified polypropylene (abbreviated as MA-PP hereafter) as a modified polyolefin, IR spectra of the mixture, a mixture of PP and terminal long-chain alkyl modified resin PA66, a mixture of PP and MA-PP, and as a reference, PP itself, terminal long-chain alkyl modified resin PA66 itself and MA-PP itself are obtained according to a KBr tablet method, respectively, and the area of peaks which are present in a range from a wavelength of 1820 $cm^{-1}$ to a wavelength of 1750 $cm^{-1}$ (peaks characteristic to MA-PP) originated from the acid anhydride contained in the mixture is subjected to comparative analyses. With respect to the mixture of PP, terminal long-chain alkyl modified resin PA66 and MA-PP, reduction in the area of peaks originated from the acid anhydride is confirmed, and thereby it is confirmed that reaction between MA-PP and terminal long-chain alkyl modified resin PA66 occurred. In this way, it is possible to confirm the presence of a layer of compatibilizer (a bonding layer) between the coating layer and the thermoplastic resin. In more detail, when the reaction occurs between MA-PP and terminal long-chain alkyl modified resin PA66, a cyclic maleic moiety in MA-PP is opened to form a chemical bond with the amine residue of terminal long-chain alkyl modified resin PA66, and the number of the cyclic maleic moieties reduces. Accordingly, the presence of a layer of the compatibilizer (a bonding layer) between the coating layer and the thermoplastic resin can be confirmed.

Further, a method for confirming that the layer of a compatibilizer formed by the terminal modified resin modified with a sterol residue lies between the coating layer and the thermoplastic resin is described below.

A microscopic infrared spectroscopic analyzer (JASCO IRT-5200) is used as an analyzer. For example, in the case of a resin composition (or a resin molded article) containing polypropylene (abbreviated as PP hereafter) as a thermoplastic resin, terminal steroid modified resin PA66 as a terminal modified resin and maleic acid-modified polypropylene (abbreviated as MA-PP hereafter) as a modified polyolefin, the resin composition (or resin molded article) is cut into slice pieces, and a cross-section of the slice piece is observed. With respect to the coating layer portion around the carbon fiber cross-section, IR mapping is performed and it is confirmed that maleic anhydride (range from a wavelength of 1820 $cm^{-1}$ to a wavelength of 1750 $cm^{-1}$) derived from the coating layer and the compatibilizer is present. Further, in the coating layer portion the presence of an amido group (range from a wavelength of 1680 $cm^{-1}$ to a wavelength of 1630 $cm^{-1}$) and a secondary amino group (range from a wavelength of 3320 $cm^{-1}$ to a wavelength of 3140 $cm^{-1}$) derived from the terminal steroid modified resin PA66 is confirmed. In this way, it is possible to confirm the formation of the coating layer on the surface of the carbon fiber and further the presence of a layer of compatibilizer (a bonding layer) between the coating layer and the thermoplastic resin. In more detail, when the reaction occurs between MA-PP and terminal steroid modified resin PA66, a cyclic maleic moiety in MA-PP is opened to form a chemical bond with the amine residue of terminal steroid modified resin PA66, and the number of the cyclic maleic moieties reduces. Accordingly, the presence of a layer of the compatibilizer (a bonding layer) between the coating layer and the thermoplastic resin can be confirmed.

Hereinafter, the details of each component of the resin composition according to the exemplary embodiment will be described.

[Thermoplastic Resin (A)]

The thermoplastic resin is a base material of the resin composition and a resin component which is reinforced by a carbon fiber (also referred to as "matrix resin").

The thermoplastic resin is not particularly limited and includes, for example, polyolefin (PO), polyphenylene sulfide (PPS), polyamide (PA), polyimide (PI), polyamide imide (PAI), polyetherimide (PEI), polyether ether ketone (PEEK), polyether sulfone (PES), polyphenylsulfone (PPSU), polysulfone (PSF), polyethylene terephthalate (PET), polybutylene terephthalate (PBT), polyacetal (POM), polycarbonate (PC), polyvinylidene fluoride (PVDF), acrylonitrile-butadiene-styrene copolymer (ABS) and acrylonitrile-styrene copolymer (AS).

The thermoplastic resins may be used one kind alone or may be used two or more kinds in combination.

Of these thermoplastic resins, from the standpoints of further improvement in the bending elastic modulus and cost, polyolefin (PO) is preferred.

Polyolefin is a resin containing a repeating unit derived from olefin and may contain a repeating unit derived from a monomer other than olefin in an amount of 30% by weight or less with respect to the total weight of the resin.

Polyolefin is obtained by addition polymerization of olefin (the monomer other than olefin, if desired).

In addition, as to each of olefin and the monomer other than olefin for obtaining polyolefin, one kind may be used or two or more kinds may be used.

Polyolefin may be a copolymer or a homopolymer. In addition, polyolefin may be straight-chain or branched.

Examples of the olefin described herein include a straight-chain or branched aliphatic olefin and an alicyclic olefin.

The aliphatic olefin includes a-olefin, for example, ethylene, propylene, 1-butene, 1-hexene, 4-methyl-l-pentene, 1-octene, 1-decene, 1-hexadecene or 1-octadecene.

In addition, the alicyclic olefin includes, for example, cyclopentene, cycloheptene, norbornene, 5-methyl-2-norbornene, tetracyclododecene and vinylcyclohexane.

Among these, from the standpoint of cost, α-olefin is preferred, ethylene or propylene is more preferred, and propylene is particularly preferred.

In addition, the monomer other than olefin is selected from known addition-polymerizable compounds.

The addition-polymerizable compound includes, for example, a styrene, for example, styrene, methylstyrene, α-methylstyrene, β-methylstyrene, tert-butylstyrene, chlorostyrene, chloromethylstyrene, methoxystyrene, styrene-sulfonic acid or a salt thereof; a (meth)acrylate, for example, an alkyl (meth)acrylate, benzyl (meth)acrylate or dimethylaminoethyl (meth)acrylate; a halovinyl, for example, vinyl chloride; a vinyl ester, for example, vinyl acetate or vinyl propionate; a vinyl ether, for example, vinyl methyl ether; a vinylidene halide, for example, vinylidene chloride; and an N-vinyl compound, for example, N-vinylpyrrolidone.

Preferred examples of the polyolefin include polypropylene (PP), polyethylene (PE), polybutene, polyisobutylene, a coumarone-indene resin, a terpene resin and an ethylene-vinyl acetate copolymer resind (EVA).

Among these, a resin containing only a repeating unit derived from olefin is preferred, and from the standpoint of cost, polypropylene is particularly preferred.

The molecular weight of the thermoplastic resin is not particularly limited and may be determined according to, for example, the kind of the resin, molding conditions and the use of the resin molded article. For example, in a case where the thermoplastic resin is a polyolefin, the weight average molecular weight (Mw) thereof is preferably in a range from 10,000 to 300,000, and more preferably in a range from 10,000 to 200,000.

As in the case of the molecular weight, the glass transition temperature (Tg) or melting temperature (Tm) of the thermoplastic resin is not particularly limited and may be determined according to, for example, the kind of the resin, molding conditions and the use of the resin molded article. For example, in a case where the thermoplastic resin is a polyolefin, the melting temperature (Tm) thereof is preferably in a range from 100° C. to 300° C., and more preferably in a range from 150° C. to 250° C.

The weight average molecular weight (Mw) and melting temperature (Tm) of polyolefin are values measured according to the method described below, respectively.

That is, the weight average molecular weight (Mw) of polyolefin is measured by gel permeation chromatography (GPC) under the conditions shown below. As a GPC system, a high-temperature GPC system "HLC-8321 GPC/HT" is used. As an eluent, o-dichlorobenzene is used. A polyolefin is once dissolved in o-dichlorobenzene at high temperature (from 140° C. to 150° C.), and the solution is filtered to obtain the filtrate as a measurement sample. The measurement is performed using an RI detector under the measurement conditions of sample concentration of 0.5%, a flow rate of 0.6 ml/min and a sample injection amount of 10 μl. In addition, a calibration curve is prepared from 10 samples of "Polystyrene Standard Sample TSK Standard": "A-500", "F-1", "F-10", "F-80", "F-380", "A-2500", "F-4", "F-40", "F-128" and "F-700" (produced by Tosoh Corp.).

In addition, the melting temperature (Tm) of polyolefin is calculated from the DSC curve obtained from differential scanning calorimetry (DSC) according to a "melting peak temperature" described in a method of calculating melting temperature in "Testing methods for transition temperatures of plastics" of JIS K 7121-1987.

The content of the thermoplastic resin may be determined according to the use of the resin molded article. For example, the content of the thermoplastic resin is preferably from 5% by weight to 95% by weight, more preferably from 10% by weight to 95% by weight, and still more preferably from 20% by weight to 95% by weight, with respect to the total weight of the resin composition.

Further, in a case where a polyolefin is used as the thermoplastic resin, it is preferred that the polyolefin accounts for 20% by weight or more with respect to the total weight of the resin composition.

[Carbon Fiber]

As the carbon fiber, a known carbon fiber is used, and any one of a PAN carbon fiber and a pitch carbon fiber is used.

The carbon fiber may be subjected to a known surface treatment.

The surface treatment for the carbon fiber includes, for example, an oxidation treatment and a sizing treatment.

The form of the carbon fiber is not particularly limited and may be selected according to, for example, the use of the resin molded article. The form of the carbon fiber includes, for example, a fiber bundle composed of a large number of single fibers, a fiber aggregate including fiber bundles, and a woven fabric in which fibers are two-dimensionally or three-dimensionally woven.

The fiber diameter, the fiber length and the like of the carbon fiber are not particularly limited and may be selected according to, for example, the use of the resin molded article.

However, since the resin molded article having high bending elastic modulus is obtained, even when the fiber length of carbon fiber is short, the average length of carbon fiber may be from 0.1 mm to 5.0 mm (preferably from 0.2 mm to 2.0 mm).

In addition, the average diameter of carbon fiber may be from 5.0 μm to 10.0 μm (preferably from 6.0 μm to 8.0 μm).

A method for measuring the average length of carbon fiber is as follows. A carbon fiber is observed by an optical microscope at a magnification of 100 to measure a length of the carbon fiber. The measurements are performed on 200 pieces of carbon fibers and the average value thereof is considered as the average length of carbon fiber.

On the other hand, a method for measuring the average diameter of carbon fiber is as follows. A cross-section orthogonal to a length direction of carbon fiber is observed by a scanning electron microscope (SEM) at a magnification of 1,000 to measure a diameter of the carbon fiber. The measurements are performed on 100 pieces of carbon fibers and the average value thereof is considered as the average diameter of carbon fiber.

In addition, as the fiber length of carbon fiber is reduced, resin-reinforcing ability of the carbon fiber tends to decrease. In particular, on request for recycling in recent years, it is carried out to pulverize resin molded articles reinforced with carbon fiber and to reuse, and fiber length of carbon fiber is often reduced at the time of pulverization of resin molded articles. Further, fiber length of carbon fiber is reduced in some cases at the time of molten-kneading during the production of resin composition. Therefore, when a resin molded article is molded by using a resin composition containing carbon fiber having a reduced fiber length, the tendency of decreasing mechanical strength, in particular, bending elastic modulus, becomes higher.

However, even when recycled products in which the fiber length of carbon fiber is reduced by pulverization of resin molded article containing carbon fiber are used as raw materials or the fiber length of carbon fiber is reduced at the time of molten-kneading, the resin composition according to the exemplary embodiment is useful for providing a resin molded article having high bending elastic modulus.

As the carbon fiber, a commercially available product may be used.

Examples of the commercially available product of the PAN carbon fiber include "TORAYCA" (registered trademark, produced by Toray Industries Inc.), "TENAX" (produced by Toho Tenax Co., Ltd.) and "PYROFIL" (registered trademark, produced by Mitsubishi Rayon Co., Ltd.). Other examples of the commercially available product of the PAN carbon fiber include commercially available products produced by Hexcel Corp., Cytec Industries Inc., Dow-Aksa, Formosa Plastics Group and SGL Carbon Japan Co., Ltd.

Examples of the commercially available product of the pitch carbon fiber include "DYAD" (registered trademark, produced by Mitsubishi Rayon Co., Ltd.), "GRANOC" (produced by Nippon Graphite Fiber Co., Ltd.) and "KURECA" (produced by Kureha Corp.). Other examples of the commercially available product of the pitch carbon fiber include commercially available products produced by Osaka Gas Chemical Co., Ltd. and Cytec Industries Inc.

The carbon fibers may be used one kind alone or may be used two or more kinds in combination.

The content of the carbon fiber is preferably from 0.1 part by weight to 200 parts by weight, more preferably from 1 part by weight to 180 parts by weight, and still more preferably from 5 parts by weight to 150 parts by weight, with respect to 100 parts by weight of the thermoplastic resin.

By adjusting the content of the carbon fiber to be 0.1 part by weight or more with respect to 100 parts by weight of the thermoplastic resin, the resin composition is reinforced. In addition, by adjusting the content of the carbon fiber to be 200 parts by weight or less with respect to 100 parts by weight of the thermoplastic resin, the moldability during the production of the resin molded article is good.

When a reinforcing fiber other than carbon fiber is used together with carbon fiber, the content of carbon fiber is preferably 80% by weight or more with respect to the total weight of the reinforcing fibers.

Hereinafter, the content (part(s) by weight) with respect to 100 parts by weight of the thermoplastic resin will also be abbreviated as "phr" (per hundred resin).

When represented by the abbreviation, the content of the carbon fiber is from 0.1 phr to 200 phr.

[Terminal Long-Chain Alkyl Modified Resin (Terminal Modified Resin)]

The terminal long-chain alkyl modified resin is a resin having a main chain having at least one terminal modified with a long chain alkyl group, the main chain containing at least one of an amide bond and an imide bond. The terminal long-chain alkyl modified resin is a resin capable of coating around the carbon fiber as described above.

The terminal long-chain alkyl modified resin will be described in detail.

<Terminal Modification>

In the terminal long-chain alkyl modified resin, at least one terminal of the main chain is modified with a long-chain alkyl group having 8 or more carbon atoms. The number of carbon atoms contained in the long-chain alkyl group for modifying the terminal is preferably from 12 to 30, and more preferably from 14 to 28, from the standpoint of improvement in the bending elastic modulus.

The long-chain alkyl group may be an alkyl group having any structure of a straight-chain form, a branched form and a cyclic form. From the standpoint of improvement in the bending elastic modulus, an alkyl group having a structure of straight-chain is preferred.

The long-chain alkyl group may contain a hetero atoms other than a carbon atom and a hydrogen atom. The hetero atom includes, for example, a nitrogen atom, an oxygen tom, a sulfur atom, a phosphorus atom, a chlorine atom, an iodine atom and a bromine atom. However, from the standpoint of improvement in the bending elastic modulus, it is preferred that the alkyl group does not contain a hetero atoms other than a carbon atom and a hydrogen atom.

The long-chain alkyl group modifying the terminal of the terminal long-chain alkyl modified resin includes, for example, an octyl group (number of carbon atoms: 8), a nonyl group (number of carbon atoms: 9), a decyl group (number of carbon atoms: 10), a lauryl group (number of carbon atoms: 12), a myristyl group (number of carbon atoms: 14), a pentadecyl group (number of carbon atoms: 15), a palmityl group (number of carbon atoms: 16), a margaryl group (number of carbon atoms: 17), a stearyl group (number of carbon atoms: 18), an eicosyl group (number of carbon atoms: 20), a behenyl group (number of carbon atoms: 22), a lignoceryl group (number of carbon atoms: 24), a cerotinyl group (number of carbon atoms: 26), a octacosyl group (number of carbon atoms: 28) and a triacontanyl group (number of carbon atoms: 30).

Of these groups, a palmityl group (number of carbon atoms: 16), a stearyl group (number of carbon atoms: 18) or an eicosyl group (number of carbon atoms: 20) is preferred from the standpoint of improvement in the bending elastic modulus.

A compound (raw material) used for the terminal modification includes a compound which has a long-chain alkyl group and is capable of reacting with a functional group which is present at a terminal of an unmodified product of a resin containing at least one of an amide bond and an imide bond in the main chain. For example, in the case where a resin forming the main chain is a polyamide, a polyimide or the like, since the resin has a carboxyl group (including an acid anhydride) or an amino group at the terminal, a compound capable of reacting with such a functional group is used.

The compound used for the terminal modification includes, for example, a carboxylic acid, an amine and an alcohol, and is selected according to the functional group which is present at the terminal of an unmodified product of the resin forming the main chain.

For example, in the case where the unmodified product of the resin forming the main chain is a polyamide having a carboxyl group (—COOH) and an amino group (—NH) at the terminals, a carboxylic acid or an amine is used as the compound for the terminal modification.

Specific examples of the compound used for the terminal modification include palmitic acid (number of carbon atoms: 16), palmitylamine (number of carbon atoms: 16), stearic acid (number of carbon atoms: 18), stearylamine (number of carbon atoms: 18), eicosic acid (number of carbon atoms: 20) and eicosylamine (number of carbon atoms: 20).

[Terminal Sterol Modified Resin (Terminal Modified Resin)]

The terminal sterol modified resin is a resin which contains at least one of an amide bond and an imide bond in a main chain and in which at least one terminal of the main chain is modified with a sterol residue. The terminal sterol modified resin is a resin capable of coating around the carbon fiber as described above.

The terminal sterol modified resin will be described in detail.

<Terminal Modification>

In the terminal sterol modified resin, at least one terminal of the main chain is modified with a sterol residue.

The sterol is also called steroid alcohol and a compound having the structure shown below as a fundamental skeleton. In the exemplary embodiment, naturally occurring sterol may be used or synthetic sterol may be used.

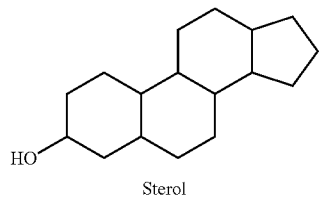 [SMILES: OC1CCC2C(CCC3C4CCCC4CCC23)C1]

Sterol

The sterol has a hydroxyl group (—OH) as shown above. The hydroxyl group reacts with a functional group in a resin which contains at least one of an amide bond and an imide bond in a main chain and has a functional group at a terminal thereof (for example, an unmodified product of a resin containing at least one of an amide bond and an imide bond in a main chain) to introduce a sterol residue (that is, a group obtained by eliminating the hydroxyl group (—OH) from sterol) at the terminal, thereby obtaining a terminal sterol modified resin.

For example, in the case where a resin forming the main chain is a polyamide, a polyimide or the like, since the resin has a carboxyl group (including an acid anhydride) at the terminal, the hydroxyl group of the sterol described above is reacted with such a functional group to obtain a terminal sterol modified resin.

A compound (raw material) used for the terminal modification, that is, sterol includes, for example, cholesterol, β-sitosterol, campesterol, stigmasterol, bras sicasterol, androsterone, β-cholesterol, corticosterone acetate, dehydroepiandrosterone, epiandrosterone, elsterol, estron, 11α-hydroxymethyltestosterone, 11α-hydroxyprogesterone, lanosterol, mestranol, methyltestosterone, $\Delta^{9(11)}$-methyltestosterone, norethisterone, progesterone and testosterone.

Of these sterols, cholesterol or β-cholesterol is preferred, and cholesterol is more preferred from the standpoint of improvement in the bending elastic modulus.

Chemical structural formulae of the typical sterols are shown below.

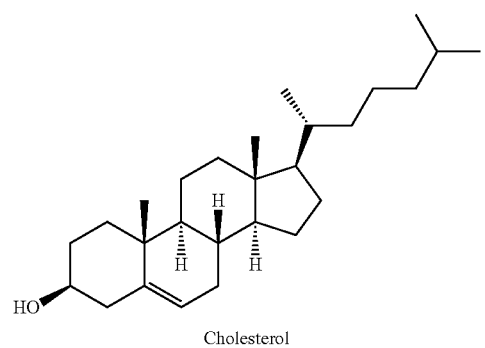
Cholesterol

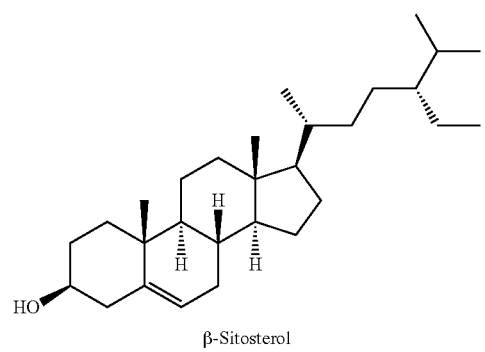
β-Sitosterol

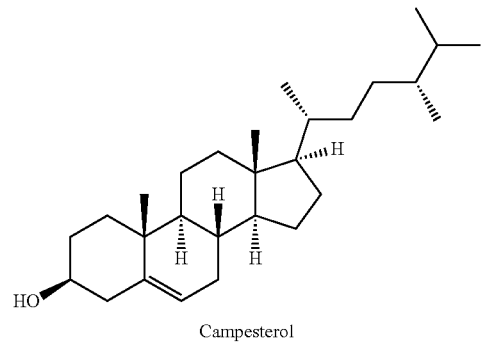
Campesterol

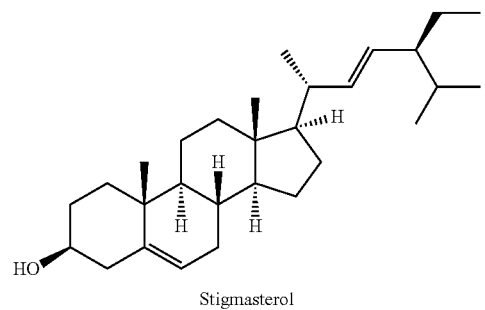
Stigmasterol

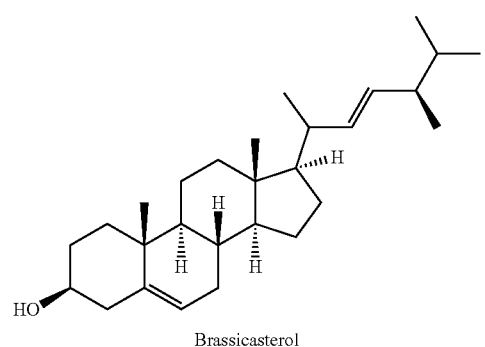
Brassicasterol

A method for terminal modification, in other words, a method for allowing to react an unmodified product of the resin forming the main chain with a compound used for the terminal modification (a long-chain alkyl group or a sterol residue) is not particularly limited, and known methods can be employed.

In the terminal long-chain alkyl modified resin, a ratio of a number of the terminals modified with a long-chain alkyl group to the total number of the terminals (terminal modification rate=number of terminals modified with long-chain alkyl group/total number of the terminals×100 (%)) is preferably in a range from 10% to 100%, more preferably in a range from 30% to 100%, and still more preferably in a range from 50% to 80%.

When the terminal modification rate is 10% or more (more preferably 30% or more, still more preferably 50% or more), the bending elastic modulus is likely to further increase. On the other hand, when the terminal modification rate is 100% or less (more preferably 80% or less), advantages of increase in adhesive force to the carbon fiber and decrease in melt viscosity are obtained.

In the terminal sterol modified resin, a ratio of a number of the terminals modified with a sterol residue to the total number of the terminals (terminal modification rate=number of terminals modified with sterol residue/total number of the terminals×100 (%)) is preferably in a range from 10% to 100%, more preferably in a range from 30% to 100%, and still more preferably in a range from 50% to 80%.

When the terminal modification rate is 10% or more (more preferably 30% or more, still more preferably 50% or more), the bending elastic modulus is likely to further increase. On the other hand, when the terminal modification rate is 100% or less (more preferably 80% or less), advantage of excellent impact resistance is obtained.

The terminal modification rate described above can be measured according to the method described below.

The terminal modified resin is hydrolyzed, and separated to a dicarboxylic acid, a diamine and a compound used for the terminal modification (compound containing a long-chain alkyl group or a cholesterol residue) to quantify, thereby obtaining a composition rate constituting the terminal modified ratio. From the equivalent ratio of dicarboxylic acid to diamine, the total number of the terminals is calculated, and from the amount of the terminal modified compound, the number of sealed terminals (modified terminals) is calculated.

<Main Chain>

Next, the main chain of the terminal modified resin will be described.

The terminal modified resin contains at least one of an imide bond and an amide bond in the main chain thereof. By containing the imide bond or the amide bond, the terminal modified resin exhibits affinity to a polar group present on a surface of the carbon fiber.

Specific kinds of the resin (unmodified product) constituting the main chain of the terminal modified resin include a thermoplastic resin containing at least one of an imide bond and an amide bond in the main chain thereof, and specific examples thereof include polyamide (PA), polyimide (PI), polyamide imide (PAI), polyether imide (PEI) and polyamino acid.

It is preferred that the terminal modified resin is a resin having low compatibility to the thermoplastic resin (base material in the resin composition), specifically, it is a resin having a solubility parameter (SP value) different from that of the thermoplastic resin.

Here, the difference between the SP value of the thermoplastic resin and the SP value of the terminal modified resin is preferably 3 or more and more preferably from 3 to 6 from the standpoint of compatibility therebetween and repulsion therebetween.

The SP value as referred to herein is a value calculated according to Fedors method. Specifically, the solubility parameter (SP value) may be calculated, for example, using the equation shown below based on the description of Polym. Eng. Sci., vol. 14, p. 147 (1974).

$$\text{SP Value} = \sqrt{(Ev/v)} = \sqrt{(\Sigma \Delta ei / \Sigma \Delta vi)} \qquad \text{Equation}$$

(wherein, Ev: evaporation energy (cal/mol), v: molar volume (cm$^3$/mol), $\Delta ei$: evaporation energy of each of atoms or an atom group, $\Delta vi$: molar volume of each of atoms or an atom group)

For the unit of the solubility parameter (SP values) is used (cal/cm$^3$)$^{1/2}$. However, the unit is omitted in accordance with customs, and the SP value is represented in a dimensionless form.

Since the terminal modified resin is preferably a rein having low compatibility to the thermoplastic resin (base material in the resin composition) and having the SP value different from that of the thermoplastic resin, it is preferred to use a different kind of thermoplastic resin from the thermoplastic resin as the base material.

In particular, polyamide (PA) is preferred from the standpoints of further improvement in the bending elastic modulus and excellent adhesion to the carbon fiber, as the resin (unmodified product) constituting the main chain of terminal modified resin.

The polyamide includes a polyamide obtained by cocondensation polymerization of a dicarboxylic acid and a diamine, a polyamide obtained by ring-opening polycondensation of a lactam, and a polyamide obtained by condensation of a dicarboxylic acid, a diamine and a lactam. In other words, the polyamide includes a polyamide having at least one of a structural unit obtained by condensation polymerization of a dicarboxylic acid and a diamine and a structural unit obtained by ring-opening of a lactam.

The polyamide may be any of a polyamide having a structural unit obtained by a condensation polymerization of a dicarboxylic acid and a diamine or a structural unit obtained by ring-opening of a lactam, and having a structural unit containing an aromatic ring exclusive of aramid, a polyamide having a structural unit containing no aromatic ring, and a polyamide having a structural unit containing an aromatic ring exclusive of an aramid structural unit and a structural unit containing no aromatic ring. From the standpoint of improvement in the bending elastic modulus, a polyamide having a structural unit containing an aromatic ring exclusive of an aramid structural unit and a structural unit containing no aromatic ring is preferred.

In particular, when a polyamide having a structural unit containing an aromatic ring exclusive of an aramid structural unit and a structural unit containing no aromatic ring is used as the polyamide, both affinities to the carbon fiber and to the thermoplastic resin are improved. The polyamide having only a structural unit containing an aromatic ring tends to have high affinity to the carbon fiber and low affinity to the thermoplastic resin in comparison with the polyamide having only a structural unit containing no aromatic ring. The polyamide having only a structural unit containing no aromatic ring tends to have low affinity to the carbon fiber and high affinity to the thermoplastic resin in comparison with the polyamide having only a structural unit containing an aromatic ring. Therefore, by using the polyamide having both of the structural units, both affinities to the carbon fiber and to the thermoplastic resin are improved so that the adhesion in the interface between the carbon fiber and the thermoplastic resin is further increased. Thus, a resin molded article having mechanical strength, in particular, high bending elastic modulus is likely to be obtained.

Further, when a polyamide having a structural unit containing an aromatic ring exclusive of an aramid structural unit and a structural unit containing no aromatic ring is used as the polyamide, the melt viscosity is decreased and the moldability (for example, extrusion moldability) is also increased. Thus, a resin molded article having high quality of external appearance is likely to be obtained.

In addition, when a polyamide only having an aramid structural unit is used as the polyamide, heat degradation of the thermoplastic resin is caused by high temperature at which the polyamide melts. On the other hand, at a temperature lower than the temperature at which the heat degradation of thermoplastic resin is caused, the polyamide does not melt sufficiently to deteriorate the moldability (for example, extrusion moldability) so that the quality of external appearance and the mechanical performance of the resin molded article obtained are decreased.

In addition, the aromatic ring represents a 5 or more membered monocyclic aromatic ring (cyclopentadiene or benzene) or a condensed ring in which a plurality of 5 or more membered monocyclic aromatic rings are fused (naphthalene or the like). The aromatic ring also includes a heterocyclic ring (pyridine or the like).

In addition, the aramid structural unit represents a structural unit obtained by a condensation polymerization reaction of a dicarboxylic acid containing an aromatic ring and a diamine containing an aromatic ring.

Here, the structural unit containing an aromatic ring exclusive of an aramid structural unit includes, for example, at least one of structural units (1) and (2) shown below.

Structural unit (1): —(—NH—$Ar^1$—NH—CO—$R^1$—CO—)— (in structural unit (1), $Ar^1$ represents a divalent organic group containing an aromatic ring, and $R^1$ represents a divalent organic group containing no aromatic ring).

Structural unit (2): —(—NH—$R^2$—NH—CO—$Ar^2$—CO—)— (in structural unit (2), $Ar^2$ represents a divalent organic group containing an aromatic ring, and $R^2$ represents a divalent organic group containing no aromatic ring).

On the other hand, the structural unit containing no aromatic ring includes, for example, at least one of structural units (3) and (4) shown below.

Structural unit (3): —(NH—$R^{31}$—NH—CO $R^{32}$—CO—)— (in structural unit (3), $R^{31}$ represents a divalent organic group containing no aromatic ring, and $R^{32}$ represents a divalent organic group containing no aromatic ring).

Structural unit (4): —(—NH—$R^4$—CO—)— (in structural unit (4), $R^4$ represents a divalent organic group containing no aromatic ring).

In structural formulae (1) to (3), the "divalent organic group" represented by each symbol is an organic group derived from a divalent organic group having a dicarboxylic acid, a diamine or a lactam. Specifically, for example, in structural unit (1), the "divalent organic group containing an aromatic ring" represented by $Ar^1$ indicates a residue obtained by eliminating two amino groups from a diamine, and the "divalent organic group containing no aromatic ring" represented by $R^1$ indicates a residue obtained by eliminating two carboxyl groups from a dicarboxylic acid. Further, in structural unit (4), the "divalent organic group containing no aromatic ring" represented by $R^4$ indicates an organic group sandwiched with the "NH group" and the "CO group" when a lactam ring is opened.

The polyamide may be any of a copolymer polyamide and a mixed polyamide. As the polyamide, a copolymer polyamide and a mixed polyamide may be used in combination. Among them, as the polyamide, a mixed polyamide is preferred from the standpoint of further improvement in the bending elastic modulus.

The copolymer polyamide includes, for example, a copolymer polyamide obtained by copolymerization of first polyamide having a structural unit containing an aromatic ring exclusive of an aramid structural unit and second polyamide having a structural unit containing no aromatic ring.

The mixed polyamide includes, for example, a mixed polyamide containing first polyamide having an aromatic ring and second polyamide having no aromatic ring.

In addition, hereinafter, for convenience, the first polyamide is also referred to as an "aromatic polyamide" and the second polyamide is also referred to as an "aliphatic polyamide".

In the copolymer polyamide, a ratio of the aromatic polyamide to the aliphatic polyamide (aromatic polyamide/aliphatic polyamide) is usually from 20/80 to 99/1 (preferably from 50/50 to 96/4) in a weight ratio from the standpoint of further improvement in the bending elastic modulus.

On the other hand, in the mixed polyamide, a ratio of the aromatic polyamide to the aliphatic polyamide (aromatic polyamide/aliphatic polyamide) is usually from 20/80 to 99/1 (preferably from 50/50 to 96/4) in a weight ratio from the standpoint of further improvement in the bending elastic modulus.

In the aromatic polyamide, a ratio of a structural unit containing an aromatic ring is usually 80% by weight or more (preferably 90% by weight or more, more preferably 100% by weight) with respect to the total structural units.

On the other hand, in the aliphatic polyamide, a ratio of a structural unit containing no aromatic ring is usually 80% by weight or more (preferably 90% by weight or more, more preferably 100% by weight) with respect to the total structural units.

The aromatic polyamide includes, for example, a condensation polymer of a dicarboxylic acid containing an aromatic ring and a diamine containing no aromatic ring, and a condensation polymer of a dicarboxylic acid containing no aromatic ring and a diamine containing an aromatic ring.

The aliphatic polyamide includes, for example, a condensation polymer of a dicarboxylic acid containing no aromatic ring and a diamine containing no aromatic ring, and a ring-opening polycondensate of a lactam containing no aromatic ring.

Examples of the dicarboxylic acid containing an aromatic ring include phthalic acid (terephthalic acid or isophthalic acid) and biphenyl dicarboxylic acid.

Examples of the dicarboxylic acid containing no aromatic ring include oxalic acid, adipic acid, suberic acid, sebacic acid, sebacic acid, 1, 4-cyclohexanedicarboxylic acid, malonic acid, succinic acid, glutaric acid, pimelic acid and azelaic acid.

Examples of the diamine containing an aromatic ring include p-phenylenediamine, m-phenylenediamine, m-xylenediamine, diaminodiphenylmethane and diaminodiphenyl ether.

Examples of the diamine containing no aromatic ring include ethylene diamine, pentamethylenediamine, hexamethylenediamine, nonanediamine, decamethylenediamine and 1,4-cyclohexanediamine.

Examples of the lactam containing no aromatic ring include c-caprolactam, undecanelactam and lauryl lactam.

In addition, the dicarboxylic acids, the diamines and the lactams may be used one kind alone or may be used two or more kinds in combination, respectively.

Examples of the aromatic polyamide include MXD6 (condensation polymer of adipic acid and m-xylenediamine), nylon 6T (condensation polymer of terephthalic acid and hexamethylenediamine), nylon 6I (condensation polymer of isophthalic acid and hexamethylenediamine), nylon 9T (condensation polymer of terephthalic acid and nonanediamine) and nylon M5T (condensation polymer of terephthalic acid and methylpentadiamine).

Examples of commercially available product of the aromatic polyamide include "MXD6" produced by Mitsubishi Gas Chemical Co., Inc., "GENESTAR (registered trademark): PA6T" produced by Kuraray Co., Ltd., "GENESTAR (registered trademark): PA9T" produced by Kuraray Co., Ltd., and "TY-502NZ: PA6T" produced by Toyobo Co., Ltd.

Examples of the aliphatic polyamide include nylon 6 (ring-opening polycondensate of ε-caprolactam), nylon 11 (ring-opening polycondensate of undecanelactam), nylon 12 (ring-opening polycondensate of lauryl lactam), nylon 66 (condensation polymer of adipic acid and hexamethylenediamine) and nylon 610 (condensation polymer of sebacic acid and hexamethylenediamine).

Examples of commercially available product of the aliphatic polyamide include "Zytel (registered trademark): 7331J (PA6)" produced by DuPont and "Zytel (registered trademark): 101L (PA66)" produced by DuPont.

<Physical Properties>

The physical properties of the terminal modified resin will be described.

The molecular weight of the terminal modified resin is not particularly limited as long as it is more likely to be melted than the thermoplastic resin which is present together in the resin composition. For example, when the terminal modified resin is a polyamide, the weight average molecular weight of the terminal modified resin is preferably in a range from 10,000 to 300,000, and more preferably in a range from 10,000 to 100,000.

Further, the glass transition temperature or melting temperature (melting point) of the terminal modified resin is not particularly limited, as in the case of the molecular weight described above, as long as it is more likely to be melted than the thermoplastic resin which is present together in the resin composition. For example, when the terminal modified resin is a polyamide, the melting temperature (Tm) of the terminal modified resin (each polyamide in the copolymer polyamide or the mixed polyamide) is preferably in a range from 100° C. to 400° C., and more preferably in a range from 150° C. to 350° C.

The content of the terminal modified resin is preferably from 0.1 part by weight to 100 parts by weight, more preferably from 0.5 parts by weight to 90 parts by weight, and still more preferably from 1 part by weight to 80 parts by weight, with respect to 100 parts by weight of the thermoplastic resin from the standpoint of further improvement in the bending elastic modulus.

By adjusting the content of the terminal modified resin to be within the range described above, the affinity to the carbon fiber is increased, and the improvement in bending elastic modulus is achieved.

In particular, in the case where a compatibilizer is used together, when the terminal modified resin is contained in such a large amount of a range from more than 20 parts by weight to 100 parts by weight with respect to 100 parts by weight of the thermoplastic resin, the amount of the compatibilizer is relatively decreased to the amount of the terminal modified resin and thus, the terminal modified resin is hard to spread in the thermoplastic resin and the tendency of localizing around the carbon fiber becomes higher. As a result, it is considered that a coating layer of the terminal modified resin is formed in a thickness increased to a certain degree and in a substantially uniform state all around the carbon fiber having a short fiber length. Thus, the adhesion in the interface between the carbon fiber and the thermoplastic resin is increased and a resin molded article having mechanical strength, in particular, high bending elastic modulus is likely to be obtained.

From the standpoint of effectively exhibiting the affinity to the carbon fiber, it is preferred that the content of the terminal modified resin is proportional to the content of the carbon fiber described above.

The content of the terminal modified resin is preferably from 0.1% by weight to 200% by weight, more preferably from 1% by weight to 150% by weight, and still more preferably from 1% by weight to 120% by weight, with respect to the weight of the carbon fiber.

When the content of the terminal modified resin is 0.1% by weight or more with respect to the weight of the carbon fiber, the affinity between the carbon fiber and the terminal modified resin is likely to be increased. When the content of the terminal modified resin is 200% by weight or less with respect to the weight of the carbon fiber, resin fluidity is improved.

Here, the adhesion between the terminal modified resin and the carbon fiber is evaluated by an index, for example, interfacial shear strength.

[Compatibilizer]

In the exemplary embodiment, in addition to three components of the thermoplastic resin, the carbon fiber and the terminal modified resin, a compatibilizer may further be used together.

The compatibilizer is a resin for increasing the affinity between the thermoplastic resin and the terminal modified resin.

The compatibilizer may be determined according to the thermoplastic resin.

It is preferred that the compatibilizer has the same structure as the thermoplastic resin and contains a portion having affinity to the terminal modified resin in a part of the molecule.

For example, in the case of using a polyolefin as the thermoplastic resin, a modified polyolefin may be used as the compatibilizer.

Here, when the thermoplastic resin is polypropylene (PP), a modified polypropylene (PP) is preferred as the modified polyolefin. Likewise, when the thermoplastic resin is an ethylene-vinyl acetate copolymer resin (EVA), a modified ethylene-vinyl acetate copolymer resins (EVA) is preferred as the modified polyolefin.

The modified polyolefin includes, for example, a polyolefin into which a modification site containing a carboxyl group, a carboxylic anhydride residue, a carboxylate residue, an imino group, an amino group, an epoxy group or the like, is introduced.

From the standpoints of further improvement in the affinity between the polyolefin and the terminal modified resin and the upper limit temperature during molding, the modification site to be introduced into polyolefin preferably contains a carboxylic anhydride residue and particularly preferably contains a maleic anhydride residue.

The modified polyolefin is obtained by using, for example, a method of allowing a compound containing the modification site described above to react with a polyolefin, whereby both compounds are directly chemically bonded, or a method of forming a graft chain using a compound containing the modification site described above and bonding the graft chain to a polyolefin.

The compound containing the modification site described above includes, for example, maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, an alkyl (meth)acrylate and derivatives thereof.

Of the modified polyolefins described above, a modified polyolefin obtained by allowing maleic anhydride as an unsaturated carboxylic acid to react with a polyolefin is preferred.

Specific examples of the modified polyolefin include an acid-modified polyolefin, for example, maleic anhydride-modified polypropylene, maleic anhydride-modified polyethylene, a maleic anhydride-modified ethylene-vinyl acetate copolymer resin (EVA) or adducts or copolymers thereof.

As the modified polyolefin, a commercially available product may be used.

The modified propylene includes, for example, YOUMEX (registered trademark) series (100TS, 110TS, 1001 and 1010) produced by Sanyo Chemical Industries, Ltd.

The modified polyethylene includes, for example, YOUMEX (registered trademark) series (2000) produced by Sanyo Chemical Industries, Ltd. and MODIC (registered trademark) series produced by Mitsubishi Chemical Corp.

The modified ethylene-vinyl acetate copolymer resin (EVA) includes, for example, MODIC (registered trademark) series produced by Mitsubishi Chemical Corp.

The molecular weight of the compatibilizer is not particularly limited and is preferably in a range from 5,000 to 100,000, and more preferably in a range from 5,000 to 80,000, from the standpoint of workability.

The content of the compatibilizer is preferably from 0.1 part by weight to 50 parts by weight, more preferably from 0.1 part by weight to 40 parts by weight, and still more preferably from 0.1 part by weight to 30 parts by weight, with respect to 100 parts by weight of the thermoplastic resin.

The content of the compatibilizer is preferably from 1 part by weight to 50 parts by weight, more preferably from 5 parts by weight to 50 parts by weight, and still more preferably from 10 parts by weight to 50 parts by weight, with respect to 100 parts by weight of the terminal modified resin.

By adjusting the content of the compatibilizer to be within the range described above, the affinity between the thermoplastic resin and the terminal modified resin is improved, and the improvement in bending elastic modulus is achieved.

From the standpoint of increasing the affinity between the thermoplastic resin and the terminal modified resin, it is preferred that the content of the compatibilizer is proportional to the content of the terminal modified resin (is indirectly proportional to the content of the carbon fiber).

The content of the compatibilizer is preferably from 1% by weight to 50% by weight, more preferably from 1% by weight to 40% by weight, and still more preferably from 1% by weight to 30% by weight, with respect to the weight of the carbon fiber.

When the content of the compatibilizer is 1% by weight or more with respect to the weight of the carbon fiber, the affinity between the carbon fiber and the terminal modified resin is likely to be obtained. When the content of the compatibilizer is 50% by weight or less (in particular, 30% by weight or less) with respect to the weight of the carbon fiber, the remaining of an unreacted functional group causing discoloration or deterioration is prevented.

[Other Components]

The resin composition according to the exemplary embodiment may contain other components in addition to the components described above.

The other components include, for example, well-known additives, for example, a flame retardant, a flame retardant auxiliary agent, a dripping inhibitor during heating, a plasticizer, an antioxidant, a release agent, a light resistant agent, a weather resistant agent, a colorant, a pigment, a modifier, an antistatic agent, a hydrolysis inhibitor, a filler or a reinforcing agent other than the carbon fiber (for example, talc, clay, mica, glass flake, milled glass, glass beads, crystalline silica, alumina, silicon nitride, aluminum nitride or boron nitride).

The content of the other components is preferably from 0 parts by weight to 10 parts by weight, and more preferably from 0 parts by weight to 5 parts by weight, with respect to 100 parts by weight of the thermoplastic resin. Here, "0 parts by weight" represents an embodiment wherein the resin composition does not contain the other components.

(Method of Producing Resin Composition)

The resin composition according to the exemplary embodiment is produced by molten-kneading the respective components described above.

Here, a known unit is used as the molten-kneading unit, and examples thereof include a twin-screw extruder, a Henschel mixer, a Bunbury mixer, a single-screw extruder, a multi-screw extruder and a co-kneader.

The temperature (cylinder temperature) during molten-kneading may be determined according to, for example, the melting temperature of the resin component constituting the resin composition.

In particular, it is preferred that the resin composition according to the exemplary embodiment is obtained by using a producing method including molten-kneading the thermoplastic resin, the carbon fiber, the terminal modified resin, and, if desired, the compatibilizer. When thermoplastic resin, the carbon fiber, the terminal modified resin, and, if desired, the compatibilizer are collectively molten-kneaded, the coating layer which is formed around the carbon fiber using the terminal modified resin is likely to be thin and substantially uniform, and the bending elastic modulus is increased.

[Resin Molded Article]

The resin molded article according to the exemplary embodiment includes the thermoplastic resin, the carbon fiber and the terminal modified resin. That is, the resin molded article according to the exemplary embodiment has the same composition as the resin composition according to the exemplary embodiment.

The resin molded article according to the exemplary embodiment may be obtained by preparing the resin composition according to the exemplary embodiment and molding the resin composition, or may be obtained by preparing a composition containing the components other than the carbon fiber and mixing the composition with the carbon fiber during molding.

The molding method may include, for example, injection molding, extrusion molding, blow molding, hot press molding, calendering molding, coating molding, cast molding, dipping molding, vacuum molding and transfer molding.

As the molding method of the resin molded article according to the exemplary embodiment, injection molding is preferred from the standpoint of obtaining high degree of freedom for the shape.

The cylinder temperature during injection molding is, for example, from 180° C. to 300° C. and preferably from 200° C. to 280° C. The mold temperature during injection molding is, for example, from 30° C. to 100° C. and preferably from 30° C. to 60° C.

The injection molding may be performed by using a commercially available machine, for example, NEX150 (produced by Nissei Plastic Industrial Co., Ltd.), NEX300 (produced by Nissei Plastic Industrial Co., Ltd.) or SE50D (produced by Sumitomo Heavy Industries, Ltd.).

The resin molded article according to the exemplary embodiment is preferably used in applications, for example, electronic and electric apparatuses, business machines, home electronics, automobile interior materials or containers. Specific examples of the applications include cases of electronic and electric apparatuses and home electronics; various components of electronic and electric apparatuses and home electronics; automobile interior components; storage cases of CD-ROM, DVD and the like; tableware; beverage bottles; food trays; wrapping materials; films; and sheets.

In particular, the resin molded article according to the exemplary embodiment is a resin molded article more excellent in the mechanical strength because the carbon fiber is used as the reinforcing fiber. Therefore, the resin molded article according to the exemplary embodiment is preferred as an alternative to a metal component.

EXAMPLE

The invention will be described more specifically with reference to the examples, but the invention should not be construed as being limited thereto.

Synthesis Example 1

Terminal Long-Chain Alkyl Modified Resin 1
(Terminal Long-Chain Alkyl Modified PA66)

Into a 50-liter autoclave are charged 11.62 kg (100 mol) of hexamethylenediamine (diamine component), 14.18 kg (97 mol) of adipic acid (dicarboxylic acid component), 1.37 kg (4.8 mol) of stearic acid (terminal modified compound), 10 g of sodium hypophosphite as a catalyst and 18 kg of ion-exchanged water, and the autoclave is pressurized from normal pressure to 0.05 MPa with $N_2$ and then depressurized to return to normal pressure. This operation is performed three times, and after $N_2$ substitution, dissolution is performed at 135° C. and 0.3 MPa with stirring. Then, the solution is continuously supplied through a liquid feed pump, and raised to 240° C. in a heating pipe to heat for one hour. Then, the reaction mixture is supplied to a pressurized reaction tank, heated at 300° C., a part of water is distilled off so as to maintain the tank internal pressure at 3 MPa, thereby obtaining a condensate. Then, the condensate is added to hot water to wash, frozen with liquid nitrogen and pulverized by a hammer. The resin powder obtained dried at 120° C. for 12 hours to obtain Terminal long-chain alkyl modified resin 1 (Terminal long-chain alkyl modified PA66) having a long-chain alkyl group at the terminal.

The terminal modification rate of Terminal long-chain alkyl modified resin 1 obtained is measured according to the method described above and it is found to be 80%.

Synthesis Example 2

Terminal Long-Chain Alkyl Modified Resin 2
(Terminal Long-Chain Alkyl Modified MXD6)

Terminal long-chain alkyl modified resin 2 (Terminal long-chain alkyl modified MXD6) having a long-chain alkyl group at the terminal is obtained in the same manner as in Synthesis Example 1 except for changing the dicarboxylic acid component to 14.18 kg (97 mol) of adipic acid, the diamine component to 13.62 kg (100 mol) of m-xylenediamine and the terminal modified compound to 1.37 kg (4.8 mol) of stearic acid, respectively.

The terminal modification rate of Terminal long-chain alkyl modified resin 2 obtained is measured according to the method described above and it is found to be 80%.

Synthesis Example 3

Terminal Long-Chain Alkyl Modified Resin 3
(Terminal Long-Chain Alkyl Modified PA66)

Terminal long-chain alkyl modified resin 3 (Terminal long-chain alkyl modified PA66) having a long-chain alkyl group at the terminal is obtained in the same manner as in Synthesis Example 1 except for changing the dicarboxylic acid component to 14.18 kg (97 mol) of adipic acid, the diamine component to 13.62 kg (100 mol) of m-xylenediamine and the terminal modified compound to 0.83 kg (4.8 mol) of decanoic acid, respectively.

The terminal modification rate of Terminal long-chain alkyl modified resin 3 obtained is measured according to the method described above and it is found to be 80%.

Synthesis Example 4

Terminal Alkyl Modified Resin 4 (Terminal Alkyl Modified PA66)

Terminal alkyl modified resin 4 (Terminal alkyl modified PA66) having an alkyl group having 6 carbon atoms at the terminal is obtained in the same manner as in Synthesis Example 1 except for changing the dicarboxylic acid component to 14.18 kg (97 mol) of adipic acid, the diamine component to 13.62 kg (100 mol) of m-xylenediamine and the terminal modified compound to 0.56 kg (4.8 mol) of caproic acid, respectively.

The terminal modification rate of Terminal alkyl modified resin 4 obtained is measured according to the method described above and it is found to be 80%.

Examples 1 to 22 and Comparative Examples 1 to 20

Pellets of resin compositions are obtained by kneading the components shown in Table 1 to Table 7 (the numerals in the tables each mean the number by parts) using a twin-screw extruder (TEM58SS, produced by Toshiba Machine Co., Ltd.) under the kneading conditions described below and at the molten-kneading temperature (cylinder temperature) shown in Table 1 to Table 7, respectively. In addition, the pellets obtained are calcined at 600° C. for 2 hours, and the average length of the carbon fiber remained is measured according to the method described above. The results of the measurement are shown in Table 1 to Table 7.
Kneading conditions: diameter of screw: Φ58 mm; number of revolution: 300 rpm; diameter of discharge nozzle: 1 mm The pellets obtained are molded using an injection molding machine (NEX150, produced by Nissei Plastic Industrial Co., Ltd.) at an injection molding temperature (cylinder temperature) shown in Table 1 to Table 7 and a mold temperature of 50° C. to obtain ISO multi-purpose dumbbell specimens (corresponding to ISO 527 tensile test and ISO 178 bending test; thickness of test part: 4 mm, width: 10 mm) and D2 specimens (length: 60 mm, width: 60 mm, thickness: 2 mm), respectively.

[Evaluation]
Using the two kinds of specimens obtained, the evaluation described below is performed.

The results of the evaluation are shown in Table 1 to Table 7.

<Bending Elastic Modulus>
As to each of the ISO multi-purpose dumbbell specimens obtained, the bending elastic modulus is measured using a universal tester (AUTOGRAPH AG-Xplus, produced by Shimadzu Corp.) according to a method based on ISO 178.

<Charpy Impact Strength without Notch (Impact Resistance)>
Using each of the ISO multi-purpose dumbbell specimens obtained, the Charpy impact strength without notch ($kJ/m^2$) is measured by a Charpy impact test at 23° C. using an evaluation device (DG-UB2, produced by Toyo Seiki Seisaku-sho, Ltd.) based on JIS-K 7111 (2006).

<Presence or Absence of Coating Layer>
Using each of the D2 specimens obtained, the presence or absence of the coating layer composed of the terminal long-chain alkyl modified resin is confirmed according to the method described above.

TABLE 1

| | | | Example | | | | | | | |
|---|---|---|---|---|---|---|---|---|---|---|
| | | | 1 | 2 | 3 | 4 | 5 | 6 | 7 | 8 |
| Composition | Thermoplastic Resin | Polypropylene | 70 | 60 | 50 | 40 | 80 | 60 | 50 | 70 |
| | | Polyethylene | | | | | | | | |
| | Reinforcing Fiber | Carbon Fiber A (Surface-Treated) | 20 | 20 | 20 | 20 | 10 | 30 | 40 | |
| | | Carbon Fiber B (Not Surface-Treated) | | | | | | | | 20 |
| | Terminal Modified Resin | Aliphatic PA | Terminal Long-Chain Alkyl Modified Resin 1 (Main Chain: PA66, Terminal: C18) | 10 | 20 | 30 | 40 | 10 | 10 | 10 | 10 |
| | | Aromatic PA | Terminal Long-Chain Alkyl Modified Resin 2 (Main Chain: MXD6, Terminal: C18) | | | | | | | | |
| | | Aliphatic PA | Terminal Long-Chain Alkyl Modified Resin 3 (Main Chain: PA66, Terminal: C10) | | | | | | | | |
| | | Aliphatic PA | Terminal Alkyl Modified Resin 4 (Main Chain: PA66, Terminal: C6) | | | | | | | | |
| | | Unmodified PA | PA66 | | | | | | | | |
| | | | MXD6 | | | | | | | | |
| | Compatibilizer | Maleic Anhydride-Modified Polypropylene | | | | | | | | | |
| | Total | | 100 | 100 | 100 | 100 | 100 | 100 | 100 | 100 |
| Conditions | Molten-Kneading Temperature (° C.) | | 270 | 270 | 270 | 270 | 270 | 270 | 270 | 270 |
| | Injection Molding Temperature (° C.) | | 270 | 270 | 270 | 270 | 270 | 270 | 270 | 270 |
| Characteristics | Bending Elastic Modulus (Gpa) | | 24.0 | 25.0 | 26.0 | 27.0 | 16.0 | 26.0 | 28.0 | 24.0 |
| | Charpy Impact Strength without Notch ($KJ/m^2$) | | 17 | 16.5 | 16 | 15.5 | 17 | 15 | 14 | 17 |
| | Presence or Absence of Coating Layer | | Present | Present | Present | Present | Present | Present | Present | Present |
| | Average Length of Carbon Fiber (mm) | | 0.3 | 0.3 | 0.3 | 0.3 | 0.3 | 0.3 | 0.3 | 0.3 |
| Remarks | Number by Parts of Carbon Fiber (To 100 Parts of Thermoplastic Resin) | | 28.57142857 | 33.33333333 | 40 | 50 | 12.5 | 50 | 80 | 28.57142857 |
| | Number by Parts of Terminal Modified Resin (To 100 Parts of Thermoplastic Resin) | | 14.28571429 | 33.33333333 | 60 | 100 | 12.5 | 16.66666667 | 20 | 14.28571429 |
| | Number by Parts of Compatibilizer (To 100 Parts of Thermoplastic Resin) | | 0 | 0 | 0 | 0 | 0 | 0 | 0 | 0 |
| | Weight % of Terminal Modified Resin (To Carbon Fiber) | | 50 | 100 | 150 | 200 | 100 | 33.33333333 | 25 | 50 |
| | Weight % of Compatibilizer (To Carbon Fiber) | | 0 | 0 | 0 | 0 | 0 | 0 | 0 | 0 |

TABLE 1-continued

| | | Example | | | | | | | |
|---|---|---|---|---|---|---|---|---|---|
| | | 1 | 2 | 3 | 4 | 5 | 6 | 7 | 8 |
| Number by Parts of Compatibilizer (To 100 Parts of Terminal Modified Resin) | | 0 | 0 | 0 | 0 | 0 | 0 | 0 | 0 |
| Carbon Fiber Amount Occupying in Resin Molded Article (%) | | 20 | 20 | 20 | 20 | 10 | 30 | 40 | 20 |

TABLE 2

| | | | | Example | | | | | | |
|---|---|---|---|---|---|---|---|---|---|---|
| | | | | 9 | 10 | 11 | 12 | 13 | 14 | 15 |
| Composition | Thermoplastic Resin | | Polypropylene | | 65 | 70 | 60 | 50 | 40 | 80 |
| | | | Polyethylene | 70 | | | | | | |
| | Reinforcing Fiber | | Carbon Fiber A (Surface-Treated) | 20 | 20 | 20 | 20 | 20 | 20 | 10 |
| | | | Carbon Fiber B (Not Surface-Treated) | | | | | | | |
| | Terminal Modified Resin | Aliphatic PA | Terminal Long-Chain Alkyl Modified Resin 1 (Main Chain: PA66, Terminal: C18) | 10 | 10 | | | | | |
| | | Aromatic PA | Terminal Long-Chain Alkyl Modified Resin 2 (Main Chain: MXD6, Terminal: C18) | | | 10 | 20 | 30 | 40 | 10 |
| | | Aliphatic PA | Terminal Long-Chain Alkyl Modified Resin 3 (Main Chain: PA66, Terminal: C10) | | | | | | | |
| | | Aliphatic PA | Terminal Alkyl Modified Resin 4 (Main Chain: PA66, Terminal: C6) | | | | | | | |
| | | Unmodified PA | PA66 | | | | | | | |
| | | | MXD6 | | | | | | | |
| | Compatibilizer | | Maleic Anhydride-Modified Polypropylene | | 5 | | | | | |
| | Total | | | 100 | 100 | 100 | 100 | 100 | 100 | 100 |
| Conditions | Molten-Kneading Temperature (° C.) | | | 270 | 270 | 240 | 240 | 240 | 240 | 240 |
| | Injection Molding Temperature (° C.) | | | 270 | 270 | 240 | 240 | 240 | 240 | 240 |
| Characteristics | Bending Elastic Modulus (Gpa) | | | 19.0 | 24 | 25.0 | 26.0 | 27.0 | 28.0 | 17.0 |
| | Charpy Impact Strength without Notch (KJ/m$^2$) | | | 14 | 17 | 16 | 15.5 | 15 | 14.5 | 16 |
| | Presence or Absence of Coating Layer | | | Present | Present | Present | Present | Present | Present | Present |
| | Average Length of Carbon Fiber (mm) | | | 0.3 | 0.3 | 0.3 | 0.3 | 0.3 | 0.3 | 0.3 |
| Remarks | Number by Parts of Carbon Fiber (To 100 Parts of Thermoplastic Resin) | | | 28.57142857 | 30.76923077 | 28.57142857 | 33.33333333 | 40 | 50 | 12.5 |
| | Number by Parts of Terminal Modified Resin (To 100 Parts of Thermoplastic Resin) | | | 14.28571429 | 15.38461538 | 14.28571429 | 33.33333333 | 60 | 100 | 12.5 |
| | Number by Parts of Compatibilizer (To 100 Parts of Thermoplastic Resin) | | | 0 | 7.692307692 | 0 | 0 | 0 | 0 | 0 |
| | Weight % of Terminal Modified Resin (To Carbon Fiber) | | | 50 | 50 | 50 | 100 | 150 | 200 | 100 |
| | Weight % of Compatibilizer (To Carbon Fiber) | | | 0 | 25 | 0 | 0 | 0 | 0 | 0 |
| | Number by Parts of Compatibilizer (To 100 Parts of Terminal Modified Resin) | | | 0 | 50 | 0 | 0 | 0 | 0 | 0 |
| | Carbon Fiber Amount Occupying in Resin Molded Article (%) | | | 20 | 20 | 20 | 20 | 20 | 20 | 10 |

TABLE 3

| | | | Example | | | |
|---|---|---|---|---|---|---|
| | | | 16 | 17 | 18 | 19 |
| Composition | Thermoplastic Resin | Polypropylene | 60 | 50 | 70 | |
| | | Polyethylene | | | | 70 |
| | Reinforcing Fiber | Carbon Fiber A (Surface-Treated) | 30 | 40 | | 20 |
| | | Carbon Fiber B (Not Surface-Treated) | | | 20 | |
| | Terminal Modified Resin | Aliphatic PA | Terminal Long-Chain Alkyl Modified Resin 1 (Main Chain: PA66, Terminal: C18) | | | | |
| | | Aromatic PA | Terminal Long-Chain Alkyl Modified Resin 2 (Main Chain: MXD6, Terminal: C18) | 10 | 10 | 10 | 10 |
| | | Aliphatic PA | Terminal Long-Chain Alkyl Modified Resin 3 (Main Chain: PA66, Terminal: C10) | | | | |
| | | Aliphatic PA | Terminal Alkyl Modified Resin 4 (Main Chain: PA66, Terminal: C6) | | | | |
| | | Unmodified PA | PA66 | | | | |
| | | | MXD6 | | | | |
| | Compatibilizer | Maleic Anhydride-Modified Polypropylene | | | | | |
| | Total | | 100 | 100 | 100 | 100 |
| Conditions | Molten-Kneading Temperature (° C.) | | 240 | 240 | 240 | 240 |
| | Injection Molding Temperature (° C.) | | 240 | 240 | 240 | 240 |
| Characteristics | Bending Elastic Modulus (Gpa) | | 27.0 | 29.0 | 25.0 | 20.0 |
| | Charpy Impact Strength without Notch (KJ/m$^2$) | | 14 | 13 | 16 | 13 |
| | Presence or Absence of Coating Layer | | Present | Present | Present | Present |
| | Average Length of Carbon Fiber (mm) | | 0.3 | 0.3 | 0.3 | 0.3 |
| Remarks | Number by Parts of Carbon Fiber (To 100 Parts of Thermoplastic Resin) | | 50 | 80 | 28.57142857 | 28.57142857 |
| | Number by Parts of Terminal Modified Resin (To 100 Parts of Thermoplastic Resin) | | 16.66666667 | 20 | 14.28571429 | 14.28571429 |
| | Number by Parts of Compatibilizer (To 100 Parts of Thermoplastic Resin) | | 0 | 0 | 0 | 0 |
| | Weight % of Terminal Modified Resin (To Carbon Fiber) | | 33.33333333 | 25 | 50 | 50 |
| | Weight % of Compatibilizer (To Carbon Fiber) | | 0 | 0 | 0 | 0 |
| | Number by Parts of Compatibilizer (To 100 Parts of Terminal Modified Resin) | | 0 | 0 | 0 | 0 |
| | Carbon Fiber Amount Occupying in Resin Molded Article (%) | | 30 | 40 | 20 | 20 |

TABLE 4

| | | | Example | | |
|---|---|---|---|---|---|
| | | | 20 | 21 | 22 |
| Composition | Thermoplastic Resin | Polypropylene | 65 | 70 | 65 |
| | | Polyethylene | | | |
| | Reinforcing Fiber | Carbon Fiber A (Surface-Treated) | 20 | 20 | 20 |
| | | Carbon Fiber B (Not Surface-Treated) | | | |
| | Terminal Modified Resin | Aliphatic PA | Terminal Long-Chain Alkyl Modified Resin 1 (Main Chain: PA66, Terminate 18) | | | |

TABLE 4-continued

|  |  |  |  | Example | | |
|---|---|---|---|---|---|---|
|  |  |  |  | 20 | 21 | 22 |
|  | Resin | Aromatic PA | Terminal Long-Chain Alkyl Modified Resin 2 (Main Chain: MXD6, Terminal: C18) | 10 |  |  |
|  |  | Aliphatic PA | Terminal Long-Chain Alkyl Modified Resin 3 (Main Chain: PA66, Terminal: C10) |  | 10 | 5 |
|  |  | Aliphatic PA | Terminal Alkyl Modified Resin 4 (Main Chain: PA66, Terminal: C6) |  |  |  |
|  |  | Unmodified PA | PA66 |  |  |  |
|  |  |  | MXD6 |  |  | 5 |
|  | Compatibilizer |  | Maleic Anhydride-Modified Polypropylene | 5 |  | 5 |
|  | Total |  |  | 100 | 100 | 100 |
| Conditions | Molten-Kneading Temperature (° C.) |  |  | 240 | 270 | 270 |
|  | Injection Molding Temperature (° C.) |  |  | 240 | 270 | 270 |
| Characteristics | Bending Elastic Modulus (Gpa) |  |  | 25 | 20 | 21 |
|  | Charpy Impact Strength without Notch (KJ/m²) |  |  | 16 | 12 | 11 |
|  | Presence or Absence of Coating Layer |  |  | Present | Present | Present |
|  | Average Length of Carbon Fiber (mm) |  |  | 0.3 | 0.3 | 0.3 |
| Remarks | Number by Parts of Carbon Fiber (To 100 Parts of Thermoplastic Resin) |  |  | 30.76923077 | 28.57142857 | 30.76923077 |
|  | Number by Parts of Terminal Modified Resin (To 100 Parts of Thermoplastic Resin) |  |  | 15.38461538 | 14.28571429 | 7.692307692 |
|  | Number by Parts of Compatibilizer (To 100 Parts of Thermoplastic Resin) |  |  | 7.692307692 | 0 | 7.692307692 |
|  | Weight % of Terminal Modified Resin (To Carbon Fiber) |  |  | 50 | 50 | 25 |
|  | Weight % of Compatibilizer (To Carbon Fiber) |  |  | 25 | 0 | 25 |
|  | Number by Parts of Compatibilizer (To 100 Parts of Terminal Modified Resin) |  |  | 50 | 0 | 100 |
|  | Carbon Fiber Amount Occupying in Resin Molded Article (%) |  |  | 20 | 20 | 20 |

TABLE 5

|  |  |  |  | Comparative Example | | | | | | |
|---|---|---|---|---|---|---|---|---|---|---|
|  |  |  |  | 1 | 2 | 3 | 4 | 5 | 6 | 7 |
| Composition | Thermoplastic Resin | Polypropylene |  | 70 | 60 | 50 | 40 | 80 | 60 | 50 |
|  |  | Polyethylene |  |  |  |  |  |  |  |  |
|  | Reinforcing Fiber | Carbon Fiber A (Surface-Treated) |  | 20 | 20 | 20 | 20 | 10 | 30 | 40 |
|  |  | Carbon Fiber B (Not Surface-Treated) |  |  |  |  |  |  |  |  |
|  | Terminal Modified Resin | Aliphatic PA | Terminal Long-Chain Alkyl Modified Resin 1 (Main Chain: PA66, Terminal: C18) |  |  |  |  |  |  |  |
|  |  | Aromatic PA | Terminal Long-Chain Alkyl Modified Resin 2 (Main Chain: MXD6, Terminal: C18) |  |  |  |  |  |  |  |
|  |  | Aliphatic PA | Terminal Long-Chain Alkyl Modified Resin 3 (Main Chain: PA66, Terminal: C10) |  |  |  |  |  |  |  |
|  |  | Aliphatic PA | Terminal Alkyl Modified Resin 4 (Main Chain: PA66, Terminal: C6) |  |  |  |  |  |  |  |

TABLE 5-continued

|  |  |  | Comparative Example | | | | | | |
|---|---|---|---|---|---|---|---|---|---|
|  |  |  | 1 | 2 | 3 | 4 | 5 | 6 | 7 |
|  | Un-modified PA | PA66 | 10 | 20 | 30 | 40 | 10 | 10 | 10 |
|  |  | MXD6 |  |  |  |  |  |  |  |
|  | Compatibilizer | Maleic Anhydride-Modified Polypropylene |  |  |  |  |  |  |  |
|  | Total |  | 100 | 100 | 100 | 100 | 100 | 100 | 100 |
| Conditions | Molten-Kneading Temperature (° C.) |  | 270 | 270 | 270 | 270 | 270 | 270 | 270 |
|  | Injection Molding Temperature (° C.) |  | 270 | 270 | 270 | 270 | 270 | 270 | 270 |
| Characteristics | Bending Elastic Modulus (Gpa) |  | 10.0 | 10.5 | 11.0 | 11.5 | 6.0 | 11.0 | 12.0 |
|  | Charpy Impact Strength without Notch (KJ/m$^2$) |  | 6 | 7 | 7 | 8 | 7.5 | 6.5 | 7.5 |
| Remarks | Presence or Absence of Coating Layer |  | Absent | Absent | Absent | Absent | Absent | Absent | Absent |
|  | Average Length of Carbon Fiber (mm) |  | 0.3 | 0.3 | 0.3 | 0.3 | 0.3 | 0.3 | 0.3 |
|  | Number by Parts of Carbon Fiber (To 100 Parts of Thermoplastic Resin) |  | 28.57142857 | 33.33333333 | 40 | 50 | 12.5 | 50 | 80 |
|  | Number by Parts of Terminal Modified Resin (To 100 Parts of Thermoplastic Resin) |  | 0 | 0 | 0 | 0 | 0 | 0 | 0 |
|  | Number by Parts of Compatibilizer (To 100 Parts of Thermoplastic Resin) |  | 0 | 0 | 0 | 0 | 0 | 0 | 0 |
|  | Weight % of Terminal Modified Resin (To Carbon Fiber) |  | 0 | 0 | 0 | 0 | 0 | 0 | 0 |
|  | Weight % of Compatibilizer (To Carbon Fiber) |  | 0 | 0 | 0 | 0 | 0 | 0 | 0 |
|  | Number by Parts of Compatibilizer (To 100 Parts of Terminal Modified Resin) |  | — | — | — | — | — | — | — |
|  | Carbon Fiber Amount Occupying in Resin Molded Article (%) |  | 20 | 20 | 20 | 20 | 10 | 30 | 40 |

TABLE 6

|  |  |  | Comparative Example | | | | | |
|---|---|---|---|---|---|---|---|---|
|  |  |  | 8 | 9 | 10 | 11 | 12 | 13 |
| Composition | Thermoplastic Resin | Polypropylene | 70 |  | 65 | 70 | 60 | 50 |
|  |  | Polyethylene |  | 70 |  |  |  |  |
|  | Reinforcing Fiber | Carbon Fiber A (Surface-Treated) |  | 20 | 20 | 20 | 20 | 20 |
|  |  | Carbon Fiber B (Not Surface-Treated) | 20 |  |  |  |  |  |
|  | Terminal Modified Resin | Aliphatic PA | Terminal Long-Chain Alkyl Modified Resin 1 (Main Chain: PA66, Terminal: C18) |  |  |  |  |  |  |
|  |  | Aromatic PA | Terminal Long-Chain Alkyl Modified Resin 2 (Main Chain: MXD6, Terminal: C18) |  |  |  |  |  |  |
|  |  | Aliphatic PA | Terminal Long-Chain Alkyl Modified Resin 3 (Main Chain: PA66, Terminal: C10) |  |  |  |  |  |  |
|  |  | Aliphatic PA | Terminal Alkyl Modified Resin 4 (Main Chain: PA66, Terminal: C6) |  |  |  |  |  |  |
|  | Un-modified PA | PA66 | 10 | 10 | 10 |  |  |  |
|  |  | MXD6 |  |  |  | 10 | 20 | 30 |
|  | Compatibilizer | Maleic Anhydride-Modified Polypropylene |  |  |  | 5 |  |  |
|  | Total |  | 100 | 100 | 100 | 100 | 100 | 100 |
| Conditions | Molten-Kneading Temperature (° C.) |  | 270 | 270 | 270 | 240 | 240 | 240 |
|  | Injection Molding Temperature (° C.) |  | 270 | 270 | 270 | 240 | 240 | 240 |
| Characteristics | Bending Elastic Modulus (Gpa) |  | 10.0 | 7.5 | 20 | 10.5 | 11.0 | 11.5 |
|  | Charpy Impact Strength without Notch (KJ/m$^2$) |  | 7 | 6 | 8 | 7.5 | 8 | 7 |

TABLE 6-continued

|  |  | Comparative Example | | | | | |
|---|---|---|---|---|---|---|---|
|  |  | 8 | 9 | 10 | 11 | 12 | 13 |
| Remarks | Presence or Absence of Coating Layer | Absent | Absent | Present | Absent | Absent | Absent |
|  | Average Length of Carbon Fiber (mm) | 0.3 | 0.3 | 0.3 | 0.3 | 0.3 | 0.3 |
|  | Number by Parts of Carbon Fiber (To 100 Parts of Thermoplastic Resin) | 28.57142857 | 28.57142857 | 30.76923077 | 28.57142857 | 33.33333333 | 40 |
|  | Number by Parts of Terminal Modified Resin (To 100 Parts of Thermoplastic Resin) | 0 | 0 | 0 | 0 | 0 | 0 |
|  | Number by Parts of Compatibilizer (To 100 Parts of Thermoplastic Resin) | 0 | 0 | 7.692307692 | 0 | 0 | 0 |
|  | Weight % of Terminal Modified Resin (To Carbon Fiber) | 0 | 0 | 0 | 0 | 0 | 0 |
|  | Weight % of Compatibilizer (To Carbon Fiber) | 0 | 0 | 25 | 0 | 0 | 0 |
|  | Number by Parts of Compatibilizer (To 100 Parts of Terminal Modified Resin) | — | — | — | — | — | — |
|  | Carbon Fiber Amount Occupying in Resin Molded Article (%) | 20 | 20 | 20 | 20 | 20 | 20 |

TABLE 7

|  |  |  | Comparative Example | | | | | | |
|---|---|---|---|---|---|---|---|---|---|
|  |  |  | 14 | 15 | 16 | 17 | 18 | 19 | 20 |
| Composition | Thermoplastic Resin | Polypropylene | 40 | 80 | 60 | 50 | 70 |  | 70 |
|  |  | Polyethylene |  |  |  |  |  | 70 |  |
|  | Reinforcing Fiber | Carbon Fiber A (Surface-Treated) | 20 | 10 | 30 | 40 |  | 20 | 20 |
|  |  | Carbon Fiber B (Not Surface-Treated) |  |  |  |  | 20 |  |  |
|  | Terminal Modified Resin | Aliphatic PA | Terminal Long-Chain Alkyl Modified Resin 1 (Main Chain: PA66, Terminal: C18) |  |  |  |  |  |  |  |
|  |  | Aromatic PA | Terminal Long-Chain Alkyl Modified Resin 2 (Main Chain: MXD6, Terminal: C18) |  |  |  |  |  |  |  |
|  |  | Aliphatic PA | Terminal Long-Chain Alkyl Modified Resin 3 (Main Chain: PA66, Terminal: C10) |  |  |  |  |  |  |  |
|  |  | Aliphatic PA | Terminal Alkyl Modified Resin 4 (Main Chain: PA66, Terminal: C6) |  |  |  |  |  |  | 10 |
|  | Unmodified PA | PA66 |  |  |  |  |  |  |  |
|  |  | MXD6 | 40 | 10 | 10 | 10 | 10 | 10 |  |
|  | Compatibilizer | Maleic Anhydride-Modified Polypropylene |  |  |  |  |  |  |  |
|  | Total |  | 100 | 100 | 100 | 100 | 100 | 100 | 100 |
| Conditions | Molten-Kneading Temperature (° C.) |  | 240 | 240 | 240 | 240 | 240 | 240 | 240 |
|  | Injection Molding Temperature (° C.) |  | 240 | 240 | 240 | 240 | 240 | 240 | 240 |
| Characteristics | Bending Elastic Modulus (Gpa) |  | 12.0 | 13.0 | 11.5 | 12.0 | 10.5 | 8.0 | 6 |
|  | Charpy Impact Strength without Notch (KJ/m²) |  | 6.5 | 7 | 6 | 6 | 8 | 7 | 6 |
| Remarks | Presence or Absence of Coating Layer |  | Absent | Absent | Absent | Absent | Absent | Absent | Present |
|  | Average Length of Carbon Fiber (mm) |  | 0.3 | 0.3 | 0.3 | 0.3 | 0.3 | 0.3 | 0.3 |
|  | Number by Parts of Carbon Fiber (To 100 Parts of Thermoplastic Resin) |  | 50 | 12.5 | 50 | 80 | 28.57142857 | 28.57142857 | 28.57142857 |
|  | Number by Parts of Terminal Modified Resin (To 100 Parts of Thermoplastic Resin) |  | 0 | 0 | 0 | 0 | 0 | 0 | 14.28571429 |
|  | Number by Parts of Compatibilizer (To 100 Parts of Thermoplastic Resin) |  | 0 | 0 | 0 | 0 | 0 | 0 | 0 |
|  | Weight % of Terminal Modified Resin (To Carbon Fiber) |  | 0 | 0 | 0 | 0 | 0 | 0 | 50 |
|  | Weight % of Compatibilizer (To Carbon Fiber) |  | 0 | 0 | 0 | 0 | 0 | 0 | 0 |

TABLE 7-continued

| | Comparative Example | | | | | | |
|---|---|---|---|---|---|---|---|
| | 14 | 15 | 16 | 17 | 18 | 19 | 20 |
| Number by Parts of Compatibilizer (To 100 Parts of Terminal Modified Resin) | — | — | — | — | — | — | 0 |
| Carbon Fiber Amount Occupying in Resin Molded Article (%) | 20 | 10 | 30 | 40 | 20 | 20 | 20 |

The details of the materials shown in Table 1 to Table 7 are as follows.
<Thermoplastic Resin>
Polypropylene (NOVATEC (registered trademark) PP MA3, produced by Japan Polypropylene Corp.)
Polyethylene (ULTZEX 20100J, produced by Prime Polymer Co., Ltd.)
<Reinforcing Fiber>
Carbon fiber A (surface-treated, chopped carbon fiber TORAYCA (registered trademark), produced by Toray Industries Inc., average length: 20 mm, average diameter: 7 μm)
Carbon fiber B (not surface-treated, obtained by dipping the chopped carbon fiber TORAYCA (registered trademark), produced by Toray Industries Inc. described above in a solvent to remove a sizing agent)
<Unmodified PA (Polyamide)>
PA66 (101L, produced by DuPont)
MXD6 (S6007, produced by Mitsubishi Gas Chemical Co., Inc.)
<Compatibilizer>
Maleic anhydride-modified polypropylene (YOUMEX (registered trademark) 110TS, produced by Sanyo Chemical Industries, Ltd.)

From the results described above, it can be seen that in the examples, a resin molded article having high bending elastic modulus can be obtained in comparison with the comparative examples.

Further, it can be seen that in the examples, a resin molded article excellent in impact resistance can be obtained in comparison with the comparative examples.

In addition, when the molded article obtained in each of Examples 10, 20 and 22 is analyzed according to the method described above, it is confirmed that a layer of the compatibilizer used (a layer of maleic anhydride-modified polypropylene) lies between the coating layer and the thermoplastic resin (a layer of the compatibilizer is formed on the surface of the coating layer).
<Synthesis of Terminal Sterol Modified Resin>

Synthesis Example 1

Terminal Sterol Modified Resin 1 (Terminal Sterol Modified PA66)

Into a 50-liter autoclave are charged 11.27 kg (97 mol) of hexamethylenediamine (diamine component), 14.61 kg (100 mol) of adipic acid (dicarboxylic acid component), 1.86 kg (4.8 mol) of cholesterol (cholesterol used for terminal modification), 10 g of sodium hypophosphite as a catalyst and 18 kg of ion-exchanged water, and the autoclave is pressurized from normal pressure to 0.05 MPa with $N_2$ and then depressurized to return to normal pressure. This operation is performed three times, and after $N_2$ substitution, dissolution is performed at 135° C. and 0.3 MPa with stirring. Then, the solution is continuously supplied through a liquid feed pump, and raised to 240° C. in a heating pipe to heat for one hour. Then, the reaction mixture is supplied to a pressurized reaction tank, heated at 300° C., a part of water is distilled off so as to maintain the tank internal pressure at 3 MPa, thereby obtaining a condensate. Then, the condensate is added to hot water to wash, frozen with liquid nitrogen and pulverized by a hammer. The resin powder obtained dried at 120° C. for 12 hours to obtain Terminal sterol modified resin 1 (Terminal sterol modified PA66) having a cholesterol residue at the terminal.

The terminal modification rate of Terminal sterol modified resin 1 obtained is measured according to the method described above and it is found to be 80%.

Synthesis Example 2

Terminal Sterol Modified Resin 2 (Terminal Sterol Modified MXD6)

Terminal sterol modified resin 2 (Terminal sterol modified MXD6) having a cholesterol residue at the terminal is obtained in the same manner as in Synthesis Example 1 except for changing the dicarboxylic acid component to 14.61 kg (100 mol) of adipic acid, the diamine component to 13.21 kg (97 mol) of m-xylenediamine and the sterol to 1.86 kg (4.8 mol) of cholesterol, respectively.

The terminal modification rate of Terminal sterol modified resin 2 obtained is measured according to the method described above and it is found to be 80%.

Synthesis Example 3

Terminal Sterol Modified Resin 3 (Terminal Sterol Modified PA66)

Terminal sterol modified resin 3 (Terminal sterol modified PA66) having a β-sitosterol residue at the terminal is obtained in the same manner as in Synthesis Example 1 except for changing the dicarboxylic acid component to 14.61 kg (100 mol) of adipic acid, the diamine component to 11.27 kg (97 mol) of hexamethylenediamine and the sterol to 1.99 kg (4.8 mol) of β-sitosterol, respectively.

The terminal modification rate of Terminal sterol modified resin 3 obtained is measured according to the method described above and it is found to be 80%.

Synthesis Example 4

Terminal Sterol Modified Resin 4 (Terminal Modified MXD6)

Terminal sterol modified resin 4 (Terminal modified MXD6) having a β-sitosterol residue at the terminal is obtained in the same manner as in Synthesis Example 1 except for changing the dicarboxylic acid component to 14.61 kg (100 mol) of adipic acid, the diamine component to 13.21 kg (97 mol) of m-xylenediamine and the sterol to 1.99 kg (4.8 mol) of β-sitosterol, respectively.

The terminal modification rate of Terminal sterol modified resin 4 obtained is measured according to the method described above and it is found to be 80%.

Examples 23 to 44 and Comparative Examples 21 to 39

Pellets of resin compositions are obtained by kneading the components shown in Table 8 to Table 14 (the numerals in the tables each mean the number by parts) using a twin-screw extruder (TEM58SS, produced by Toshiba Machine Co., Ltd.) under the kneading conditions described below and at the molten-kneading temperature (cylinder temperature) shown in Table 8 to Table 14, respectively. In addition, the pellets obtained are calcined at 600° C. for 2 hours, and the average length of the carbon fiber remained is measured according to the method described above. The results of the measurement are shown in Table 8 to Table 14.
Kneading conditions: diameter of screw: Φ58 mm; number of revolution: 300 rpm; diameter of discharge nozzle: 1 mm The pellets obtained are molded using an injection molding machine (NEX150, produced by Nissei Plastic Industrial Co., Ltd.) at an injection molding temperature (cylinder temperature) shown in Table 1 to Table 7 and a mold temperature of 50° C. to obtain ISO multi-purpose dumbbell specimens (corresponding to ISO 527 tensile test and ISO 178 bending test; thickness of test part: 4 mm, width: 10 mm) and D2 specimens (length: 60 mm, width: 60 mm, thickness: 2 mm), respectively.

[Evaluation]

Using the two kinds of specimens obtained, the evaluation described below is performed.

The results of the evaluation are shown in Table 8 to Table 14.

<Bending Elastic Modulus>

As to each of the ISO multi-purpose dumbbell specimens obtained, the bending elastic modulus is measured using a universal tester (AUTOGRAPH AG-Xplus, produced by Shimadzu Corp.) according to a method based on ISO 178.

<Charpy Impact Strength Without Notch (Impact Resistance)>

Using each of the ISO multi-purpose dumbbell specimens obtained, the Charpy impact strength without notch (kJ/m$^2$) is measured by a Charpy impact test at 23° C. using an evaluation device (DG-UB2, produced by Toyo Seiki Seisaku-sho, Ltd.) based on JIS-K 7111 (2006).

<Presence or Absence of Coating Layer>

Using each of the D2 specimens obtained, the presence or absence of the coating layer composed of the terminal sterol modified resin is confirmed according to the method described above.

TABLE 8

| | | | Example | | | | | | |
|---|---|---|---|---|---|---|---|---|---|
| | | | 23 | 24 | 25 | 26 | 27 | 28 | 29 |
| Composition | Thermoplastic Resin | Polypropylene | 70 | 60 | 50 | 40 | 80 | 60 | 50 |
| | | Polyethylene | | | | | | | |
| | Reinforcing Fiber | Carbon Fiber A (Surface-Treated) | 20 | 20 | 20 | 20 | 10 | 30 | 40 |
| | | Carbon Fiber B (Not Surface-Treated) | | | | | | | |
| | Terminal Modified Resin | Aliphatic PA | Terminal Sterol Modified Resin 1 (Main Chain: PA66, Terminal: Cholesterol) | 10 | 20 | 30 | 40 | 10 | 10 | 10 |
| | | Aromatic PA | Terminal Sterol Modified Resin 2 (Main Chain: MXD6, Terminal: Cholesterol) | | | | | | | |
| | | Aliphatic PA | Terminal Sterol Modified Resin 3 (Main Chain: PA66, Terminal: β-Sitosterol) | | | | | | | |
| | | Aromatic PA | Terminal Sterol Modified Resin 4 (Main Chain: MXD6, Terminal: β-Sitosterol) | | | | | | | |
| | | Unmodified PA | PA66 | | | | | | | |
| | | | MXD6 | | | | | | | |
| | Compatibilizer | | Maleic Anhydride-Modified Polypropylene | | | | | | | |
| | Total | | | 100 | 100 | 100 | 100 | 100 | 100 | 100 |
| Conditions | Molten-Kneading Temperature (° C.) | | | 270 | 270 | 270 | 270 | 270 | 270 | 270 |
| | Injection Molding Temperature (° C.) | | | 270 | 270 | 270 | 270 | 270 | 270 | 270 |
| Characteristics | Bending Elastic Modulus (Gpa) | | | 26 | 27 | 28 | 29 | 18 | 28 | 30 |
| | Charpy Impact Strength without Notch (KJ/m$^2$) | | | 18.5 | 18 | 17.5 | 17 | 18.5 | 16.5 | 15.5 |
| | Presence or Absence of Coating Layer | | | Present | Present | Present | Present | Present | Present | Present |
| | Average Length of Carbon Fiber (mm) | | | 0.3 | 0.3 | 0.3 | 0.3 | 0.3 | 0.3 | 0.3 |

TABLE 8-continued

| | | Example | | | | | | |
|---|---|---|---|---|---|---|---|---|
| | | 23 | 24 | 25 | 26 | 27 | 28 | 29 |
| Remarks | Number by Parts of Carbon Fiber (To 100 Parts of Thermoplastic Resin) | 28.57142857 | 33.33333333 | 40 | 50 | 12.5 | 50 | 80 |
| | Number by Parts of Terminal Modified Resin (To 100 Parts of Thermoplastic Resin) | 14.28571429 | 33.33333333 | 60 | 100 | 12.5 | 16.66666667 | 20 |
| | Number by Parts of Compatibilizer (To 100 Parts of Thermoplastic Resin) | 0 | 0 | 0 | 0 | 0 | 0 | 0 |
| | Weight % of Terminal Modified Resin (To Carbon Fiber) | 50 | 100 | 150 | 200 | 100 | 33.33333333 | 25 |
| | Weight % of Compatibilizer (To Carbon Fiber) | 0 | 0 | 0 | 0 | 0 | 0 | 0 |
| | Number by Parts of Compatibilizer (To 100 Parts of Terminal Modified Resin) | 0 | 0 | 0 | 0 | 0 | 0 | 0 |
| | Carbon Fiber Amount Occupying in Resin Molded Article (%) | 20 | 20 | 20 | 20 | 10 | 30 | 40 |

TABLE 9

| | | | Example | | | | |
|---|---|---|---|---|---|---|---|
| | | | 30 | 31 | 32 | 33 | 34 |
| Composition | Thermoplastic Resin | Polypropylene | 70 | | 65 | 70 | 60 |
| | | Polyethylene | | 70 | | | |
| | Reinforcing Fiber | Carbon Fiber A (Surface-Treated) | | 20 | 20 | 20 | 20 |
| | | Carbon Fiber B (Not Surface-Treated) | 20 | | | | |
| | Terminal Modified Resin | Aliphatic PA | Terminal Sterol Modified Resin 1 (Main Chain: PA66, Terminal: Cholesterol) | 10 | 10 | 10 | | |
| | | Aromatic PA | Terminal Sterol Modified Resin 2 (Main Chain: MXD6, Terminal: Cholesterol) | | | | 10 | 20 |
| | | Aliphatic PA | Terminal Sterol Modified Resin 3 (Main Chain: PA66, Terminal: β-Sitosterol) | | | | | |
| | | Aromatic PA | Terminal Sterol Modified Resin 4 (Main Chain: MXD6, Terminal: β-Sitosterol) | | | | | |
| | | Unmodified PA | PA66 | | | | | |
| | | | MXD6 | | | | | |
| | Compatibilizer | Maleic Anhydride-Modified Polypropylene | | | 5 | | |
| | Total | | 100 | 100 | 100 | 100 | 100 |
| Conditions | Molten-Kneading Temperature (° C.) | | 270 | 270 | 270 | 240 | 240 |
| | Injection Molding Temperature (° C.) | | 270 | 270 | 270 | 240 | 240 |
| Characteristics | Bending Elastic Modulus (Gpa) | | 26 | 21 | 26 | 27 | 28 |
| | Charpy Impact Strength without Notch (KJ/m$^2$) | | 18.5 | 15.5 | 18.5 | 17.5 | 17 |
| | Presence or Absence of Coating Layer | | Present | Present | Present | Present | Present |
| | Average Length of Carbon Fiber (mm) | | 0.3 | 0.3 | 0.3 | 0.3 | 0.3 |
| Remarks | Number by Parts of Carbon Fiber (To 100 Parts of Thermoplastic Resin) | | 28.57142857 | 28.57142857 | 30.76923077 | 28.57142857 | 33.33333333 |
| | Number by Parts of Terminal Modified Resin (To 100 Parts of Thermoplastic Resin) | | 14.28571429 | 14.28571429 | 15.38461538 | 14.28571429 | 33.33333333 |
| | Number by Parts of Compatibilizer (To 100 Parts of Thermoplastic Resin) | | 0 | 0 | 7.692307692 | 0 | 0 |
| | Weight % of Terminal Modified Resin (To Carbon Fiber) | | 50 | 50 | 50 | 50 | 100 |

TABLE 9-continued

|  |  | Example | | | | |
|---|---|---|---|---|---|---|
|  |  | 30 | 31 | 32 | 33 | 34 |
| Weight % of Compatibilizer (To Carbon Fiber) | | 0 | 0 | 25 | 0 | 0 |
| Number by Parts of Compatibilizer (To 100 Parts of Terminal Modified Resin) | | 0 | 0 | 50 | 0 | 0 |
| Carbon Fiber Amount Occupying in Resin Molded Article (%) | | 20 | 20 | 20 | 20 | 20 |

TABLE 10

|  |  |  | Example | | | | | |
|---|---|---|---|---|---|---|---|---|
|  |  |  | 35 | 36 | 37 | 38 | 39 | 40 |
| Composition | Thermoplastic Resin | Polypropylene | 50 | 40 | 80 | 60 | 50 | 70 |
|  |  | Polyethylene |  |  |  |  |  |  |
|  | Reinforcing Fiber | Carbon Fiber A (Surface-Treated) | 20 | 20 | 10 | 30 | 40 |  |
|  |  | Carbon Fiber B (Not Surface-Treated) |  |  |  |  |  | 20 |
|  | Terminal Modified Resin | Aliphatic PA | Terminal Sterol Modified Resin 1 (Main Chain: PA66, Terminal: Cholesterol) |  |  |  |  |  |  |
|  |  | Aromatic PA | Terminal Sterol Modified Resin 2 (Main Chain: MXD6, Terminal: Cholesterol) | 30 | 40 | 10 | 10 | 10 | 10 |
|  |  | Aliphatic PA | Terminal Sterol Modified Resin 3 (Main Chain: PA66, Terminal: β-Sitosterol) |  |  |  |  |  |  |
|  |  | Aromatic PA | Terminal Sterol Modified Resin 4 (Main Chain: MXD6, Terminal: β-Sitosterol) |  |  |  |  |  |  |
|  |  | Unmodified PA | PA66 |  |  |  |  |  |  |
|  |  |  | MXD6 |  |  |  |  |  |  |
|  | Compatibilizer | Maleic Anhydride-Modified Polypropylene |  |  |  |  |  |  |
|  |  | Total | 100 | 100 | 100 | 100 | 100 | 100 |
| Conditions | Molten-Kneading Temperature (° C.) | | 240 | 240 | 240 | 240 | 240 | 240 |
|  | Injection Molding Temperature (° C.) | | 240 | 240 | 240 | 240 | 240 | 240 |
| Characteristics | Bending Elastic Modulus (Gpa) | | 29 | 30 | 19 | 29 | 31 | 27 |
|  | Charpy Impact Strength without Notch (KJ/m$^2$) | | 16.5 | 16 | 17.5 | 15.5 | 14.5 | 17.5 |
|  | Presence or Absence of Coating Layer | | Present | Present | Present | Present | Present | Present |
|  | Average Length of Carbon Fiber (mm) | | 0.3 | 0.3 | 0.3 | 0.3 | 0.3 | 0.3 |
| Remarks | Number by Parts of Carbon Fiber (To 100 Parts of Thermoplastic Resin) | | 40 | 50 | 12.5 | 50 | 80 | 28.57142857 |
|  | Number by Parts of Terminal Modified Resin (To 100 Parts of Thermoplastic Resin) | | 60 | 100 | 12.5 | 16.66666667 | 20 | 14.28571429 |
|  | Number by Parts of Compatibilizer (To 100 Parts of Thermoplastic Resin) | | 0 | 0 | 0 | 0 | 0 | 0 |
|  | Weight % of Terminal Modified Resin (To Carbon Fiber) | | 150 | 200 | 100 | 33.33333333 | 25 | 50 |
|  | Weight % of Compatibilizer (To Carbon Fiber) | | 0 | 0 | 0 | 0 | 0 | 0 |
|  | Number by Parts of Compatibilizer (To 100 Parts of Terminal Modified Resin) | | 0 | 0 | 0 | 0 | 0 | 0 |
|  | Carbon Fiber Amount Occupying in Resin Molded Article (%) | | 20 | 20 | 10 | 30 | 40 | 20 |

TABLE 11

|  |  |  | Example 41 | Example 42 | Example 43 | Example 44 |
|---|---|---|---|---|---|---|
| Composition | Thermoplastic Resin | Polypropylene |  | 65 | 70 | 70 |
|  |  | Polyethylene | 70 |  |  |  |
|  | Reinforcing Fiber | Carbon Fiber A (Surface-Treated) | 20 | 20 | 20 | 20 |
|  |  | Carbon Fiber B (Not Surface-Treated) |  |  |  |  |
|  | Terminal Modified Resin | Aliphatic PA | Terminal Sterol Modified Resin 1 (Main Chain: PA66, Terminal: Cholesterol) |  |  |  |  |
|  |  | Aromatic PA | Terminal Sterol Modified Resin 2 (Main Chain: MXD6, Terminal: Cholesterol) | 10 | 10 |  |  |
|  |  | Aliphatic PA | Terminal Sterol Modified Resin 3 (Main Chain: PA66, Terminal: β-Sitosterol) |  |  | 10 |  |
|  |  | Aromatic PA | Terminal Sterol Modified Resin 4 (Main Chain: MXD6, Terminal: β-Sitosterol) |  |  |  | 10 |
|  |  | Unmodified PA | PA66 |  |  |  |  |
|  |  |  | MXD6 |  |  |  |  |
|  | Compatibilizer | Maleic Anhydride-Modified Polypropylene |  |  | 5 |  |  |
|  | Total |  | 100 | 100 | 100 | 100 |
| Conditions | Molten-Kneading Temperature (° C.) |  | 240 | 240 | 270 | 240 |
|  | Injection Molding Temperature (° C.) |  | 240 | 240 | 270 | 240 |
| Characteristics | Bending Elastic Modulus (Gpa) |  | 22 | 27 | 26 | 27 |
|  | Charpy Impact Strength without Notch (KJ/m$^2$) |  | 14.5 | 17.5 | 18.5 | 17.5 |
|  | Presence or Absence of Coating Layer |  | Present | Present | Present | Present |
|  | Average Length of Carbon Fiber (mm) |  | 0.3 | 0.3 | 0.3 | 0.3 |
| Remarks | Number by Parts of Carbon Fiber (To 100 Parts of Thermoplastic Resin) |  | 28.57142857 | 30.76923077 | 28.57142857 | 28.57142857 |
|  | Number by Parts of Terminal Modified Resin (To 100 Parts of Thermoplastic Resin) |  | 14.28571429 | 15.38461538 | 14.28571429 | 14.28571429 |
|  | Number by Parts of Compatibilizer (To 100 Parts of Thermoplastic Resin) |  | 0 | 7.692307692 | 0 | 0 |
|  | Weight % of Terminal Modified Resin (To Carbon Fiber) |  | 50 | 50 | 50 | 50 |
|  | Weight % of Compatibilizer (To Carbon Fiber) |  | 0 | 25 | 0 | 0 |
|  | Number by Parts of Compatibilizer (To 100 Parts of Terminal Modified Resin) |  | 0 | 50 | 0 | 0 |
|  | Carbon Fiber Amount Occupying in Resin Molded Article (%) |  | 20 | 20 | 20 | 20 |

TABLE 12

|  |  |  | Comparative Example 21 | 22 | 23 | 24 | 25 | 26 | 27 |
|---|---|---|---|---|---|---|---|---|---|
| Composition | Thermoplastic Resin | Polypropylene | 70 | 60 | 50 | 40 | 80 | 60 | 50 |
|  |  | Polyethylene |  |  |  |  |  |  |  |
|  | Reinforcing Fiber | Carbon Fiber A (Surface-Treated) | 20 | 20 | 20 | 20 | 10 | 30 | 40 |
|  |  | Carbon Fiber B (Not Surface-Treated) |  |  |  |  |  |  |  |
|  | Terminal Modified | Aliphatic PA | Terminal Sterol Modified Resin 1 (Main Chain: PA66, Terminal: |  |  |  |  |  |  |  |

TABLE 12-continued

| | | | Comparative Example | | | | | | |
|---|---|---|---|---|---|---|---|---|---|
| | | | 21 | 22 | 23 | 24 | 25 | 26 | 27 |
| | Resin | Cholesterol) | | | | | | | |
| | Aromatic PA | Terminal Sterol Modified Resin 2 (Main Chain: MXD6, Terminal: Cholesterol) | | | | | | | |
| | Aliphatic PA | Terminal Sterol Modified Resin 3 (Main Chain: PA66, Terminal: β-Sitosterol) | | | | | | | |
| | Aromatic PA | Terminal Sterol Modified Resin 4 (Main Chain: MXD6, Terminal: β-Sitosterol) | | | | | | | |
| | Unmodified PA | PA66 | 10 | 20 | 30 | 40 | 10 | 10 | 10 |
| | | MXD6 | | | | | | | |
| | Compatibilizer | Maleic Anhydride-Modified Polypropylene | | | | | | | |
| | Total | | 100 | 100 | 100 | 100 | 100 | 100 | 100 |
| Conditions | Molten-Kneading Temperature (° C.) | | 270 | 270 | 270 | 270 | 270 | 270 | 270 |
| | Injection Molding Temperature (° C.) | | 270 | 270 | 270 | 270 | 270 | 270 | 270 |
| Characteristics | Bending Elastic Modulus (Gpa) | | 10.0 | 10.5 | 11.0 | 11.5 | 6.0 | 11.0 | 12.0 |
| | Charpy Impact Strength without Notch (KJ/m$^2$) | | 6 | 7 | 7 | 8 | 7.5 | 6.5 | 7.5 |
| | Presence or Absence of Coating Layer | | Absent | Absent | Absent | Absent | Absent | Absent | Absent |
| | Average Length of Carbon Fiber (mm) | | 0.3 | 0.3 | 0.3 | 0.3 | 0.3 | 0.3 | 0.3 |
| Remarks | Number by Parts of Carbon Fiber (To 100 Parts of Thermoplastic Resin) | | 28.57142857 | 33.33333333 | 40 | 50 | 12.5 | 50 | 80 |
| | Number by Parts of Terminal Modified Resin (To 100 Parts of Thermoplastic Resin) | | 0 | 0 | 0 | 0 | 0 | 0 | 0 |
| | Number by Parts of Compatibilizer (To 100 Parts of Thermoplastic Resin) | | 0 | 0 | 0 | 0 | 0 | 0 | 0 |
| | Weight % of Terminal Modified Resin (To Carbon Fiber) | | 0 | 0 | 0 | 0 | 0 | 0 | 0 |
| | Weight % of Compatibilizer (To Carbon Fiber) | | 0 | 0 | 0 | 0 | 0 | 0 | 0 |
| | Number by Parts of Compatibilizer (To 100 Parts of Terminal Modified Resin) | | — | — | — | — | — | — | — |
| | Carbon Fiber Amount Occupying in Resin Molded Article (%) | | 20 | 20 | 20 | 20 | 10 | 30 | 40 |

TABLE 13

| | | | Comparative Example | | | | |
|---|---|---|---|---|---|---|---|
| | | | 28 | 29 | 30 | 31 | 32 |
| Composition | Thermoplastic Resin | Polypropylene | 70 | | 65 | 70 | 60 |
| | | Polyethylene | | 70 | | | |
| | Reinforcing Fiber | Carbon Fiber A (Surface-Treated) | | | 20 | 20 | 20 |
| | | Carbon Fiber B (Not Surface-Treated) | 20 | | | | |
| | Terminal Modified Resin | Aliphatic PA | Terminal Sterol Modified Resin 1 (Main Chain: PA66, Terminal: Cholesterol) | | | | |
| | | Aromatic PA | Terminal Sterol Modified Resin 2 (Main Chain: MXD6, Terminal: Cholesterol) | | | | |

TABLE 13-continued

|  |  |  | Comparative Example | | | | |
|---|---|---|---|---|---|---|---|
|  |  |  | 28 | 29 | 30 | 31 | 32 |
|  | Aliphatic PA | Terminal Sterol Modified Resin 3 (Main Chain: PA66, Terminal: β-Sitosterol) |  |  |  |  |  |
|  | Aromatic PA | Terminal Sterol Modified Resin 4 (Main Chain: MXD6, Terminal: β-Sitosterol) |  |  |  |  |  |
|  | Unmodified PA | PA66 | 10 | 10 | 10 |  |  |
|  |  | MXD6 |  |  |  | 10 | 20 |
|  | Compatibilizer | Maleic Anhydride-Modified Polypropylene |  |  | 5 |  |  |
|  | Total |  | 100 | 100 | 100 | 100 | 100 |
| Conditions | Molten-Kneading Temperature (° C.) |  | 270 | 270 | 270 | 240 | 240 |
|  | Injection Molding Temperature (° C.) |  | 270 | 270 | 270 | 240 | 240 |
| Characteristics | Bending Elastic Modulus (Gpa) |  | 10.0 | 7.5 | 20 | 10.5 | 11.0 |
|  | Charpy Impact Strength without Notch (KJ/m$^2$) |  | 7 | 6 | 8 | 7.5 | 8 |
|  | Presence or Absence of Coating Layer |  | Absent | Absent | Present | Absent | Absent |
|  | Average Length of Carbon Fiber (mm) |  | 0.3 | 0.3 | 0.3 | 0.3 | 0.3 |
| Remarks | Number by Parts of Carbon Fiber (To 100 Parts of Thermoplastic Resin) |  | 28.57142857 | 28.57142857 | 30.76923077 | 28.57142857 | 33.33333333 |
|  | Number by Parts of Terminal Modified Resin (To 100 Parts of Thermoplastic Resin) |  | 0 | 0 | 0 | 0 | 0 |
|  | Number by Parts of Compatibilizer (To 100 Parts of Thermoplastic Resin) |  | 0 | 0 | 7.692307692 | 0 | 0 |
|  | Weight % of Terminal Modified Resin (To Carbon Fiber) |  | 0 | 0 | 0 | 0 | 0 |
|  | Weight % of Compatibilizer (To Carbon Fiber) |  | 0 | 0 | 25 | 0 | 0 |
|  | Number by Parts of Compatibilizer (To 100 Parts of Terminal Modified Resin) |  | — | — | — | — | — |
|  | Carbon Fiber Amount Occupying in Resin Molded Article (%) |  | 20 | 20 | 20 | 20 | 20 |

TABLE 14

|  |  |  | Comparative Example | | | | | | |
|---|---|---|---|---|---|---|---|---|---|
|  |  |  | 33 | 34 | 35 | 36 | 37 | 38 | 39 |
| Composition | Thermoplastic Resin | Polypropylene | 50 | 40 | 80 | 60 | 50 | 70 |  |
|  |  | Polyethylene |  |  |  |  |  |  | 70 |
|  | Reinforcing Fiber | Carbon Fiber A (Surface-Treated) | 20 | 20 | 10 | 30 | 40 |  | 20 |
|  |  | Carbon Fiber B (Not Surface-Treated) |  |  |  |  |  | 20 |  |
|  | Terminal Modified Resin | Aliphatic PA | Terminal Sterol Modified Resin 1 (Main Chain: PA66, Terminal: Cholesterol) |  |  |  |  |  |  |  |
|  |  | Aromatic PA | Terminal Sterol Modified Resin 2 (Main Chain: MXD6, Terminal: Cholesterol) |  |  |  |  |  |  |  |
|  |  | Aliphatic PA | Terminal Sterol Modified Resin 3 (Main Chain: PA66, Terminal: β-Sitosterol) |  |  |  |  |  |  |  |

TABLE 14-continued

|  |  |  | Comparative Example | | | | | | |
|---|---|---|---|---|---|---|---|---|---|
|  |  |  | 33 | 34 | 35 | 36 | 37 | 38 | 39 |
|  | Aromatic PA | Terminal Sterol Modified Resin 4 (Main Chain: MXD6, Terminal: β-Sitosterol) |  |  |  |  |  |  |  |
|  | Unmodified PA | PA66 |  |  |  |  |  |  |  |
|  |  | MXD6 | 30 | 40 | 10 | 10 | 10 | 10 | 10 |
|  | Compatibilizer | Maleic Anhydride-Modified Polypropylene |  |  |  |  |  |  |  |
|  | Total |  | 100 | 100 | 100 | 100 | 100 | 100 | 100 |
| Conditions | Molten-Kneading Temperature (° C.) |  | 240 | 240 | 240 | 240 | 240 | 240 | 240 |
|  | Injection Molding Temperature (° C.) |  | 240 | 240 | 240 | 240 | 240 | 240 | 240 |
| Characteristics | Bending Elastic Modulus (Gpa) |  | 11.5 | 12.0 | 13.0 | 11.5 | 12.0 | 10.5 | 8.0 |
|  | Charpy Impact Strength without Notch (KJ/m$^2$) |  | 7 | 6.5 | 7 | 6 | 6 | 8 | 7 |
|  | Presence or Absence of Coating Layer |  | Absent | Absent | Absent | Absent | Absent | Absent | Absent |
|  | Average Length of Carbon Fiber (mm) |  | 0.3 | 0.3 | 0.3 | 0.3 | 0.3 | 0.3 | 0.3 |
| Remarks | Number by Parts of Carbon Fiber (To 100 Parts of Thermoplastic Resin) |  | 40 | 50 | 12.5 | 50 | 80 | 28.57142857 | 28.57142857 |
|  | Number by Parts of Terminal Modified Resin (To 100 Parts of Thermoplastic Resin) |  | 0 | 0 | 0 | 0 | 0 | 0 | 0 |
|  | Number by Parts of Compatibilizer (To 100 Parts of Thermoplastic Resin) |  | 0 | 0 | 0 | 0 | 0 | 0 | 0 |
|  | Weight % of Terminal Modified Resin (To Carbon Fiber) |  | 0 | 0 | 0 | 0 | 0 | 0 | 0 |
|  | Weight % of Compatibilizer (To Carbon Fiber) |  | 0 | 0 | 0 | 0 | 0 | 0 | 0 |
|  | Number by Parts of Compatibilizer (To 100 Parts of Terminal Modified Resin) |  | — | — | — | — | — | — | — |
|  | Carbon Fiber Amount Occupying in Resin Molded Article (%) |  | 20 | 20 | 10 | 30 | 40 | 20 | 20 |

The details of the materials shown in Table 8 to Table 14 are as follows.

<Thermoplastic Resin>

Polypropylene (NOVATEC (registered trademark) PP MA3, produced by Japan Polypropylene Corp.)

Polyethylene (ULTZEX 20100J, produced by Prime Polymer Co., Ltd.)

<Reinforcing Fiber>

Carbon fiber A (surface-treated, chopped carbon fiber TORAYCA (registered trademark), produced by Toray Industries Inc., average fiber length: 20 mm, average diameter: 7 μm)

Carbon fiber B (not surface-treated, obtained by dipping the chopped carbon fiber TORAYCA (registered trademark), produced by Toray Industries Inc. described above in a solvent to remove a sizing agent)

<Unmodified PA (Polyamide)>

PA66 (101L, produced by DuPont)

MXD6 (S6007, produced by Mitsubishi Gas Chemical Co., Inc.)

<Compatibilizer>

Maleic anhydride-modified polypropylene (YOUMEX (registered trademark) 110TS, produced by Sanyo Chemical Industries, Ltd.)

From the results described above, it can be seen that in the examples, a resin molded article having high bending elastic modulus can be obtained in comparison with the comparative examples.

Further, it can be seen that in the examples, a resin molded article excellent in impact resistance can be obtained in comparison with the comparative examples.

In addition, when the molded article obtained in each of Examples 32 and 42 is analyzed according to the method described above, it is confirmed that a layer of the compatibilizer used (a layer of maleic anhydride-modified polypropylene) lies between the coating layer and the thermoplastic resin (a layer of the compatibilizer is formed on the surface of the coating layer).

What is claimed is:

1. A resin composition comprising:
   a thermoplastic resin;
   a carbon fiber; and
   a terminal modified resin comprising a main chain having at least one terminal modified with a long chain alkyl group having 8 or more carbon atoms, the main chain comprising at least one of an amide bond and an imide bond,
   wherein an average length of the carbon fiber is from 0.1 mm to 5.0 mm.

2. The resin composition according to claim 1, wherein the thermoplastic resin is a polyolefin.

3. The resin composition according to claim 1, wherein the terminal modified resin is a polyamide comprising the amide bond in the main chain.

4. The resin composition according to claim 1, wherein a content of the terminal modified resin is from 0.1 part by weight to 100 parts by weight with respect to 100 parts by weight of the thermoplastic resin.

5. The resin composition according to claim 1, wherein a content of the terminal modified resin is from 0.1% by weight to 200% by weight with respect to a weight of the carbon fiber.

6. The resin composition according to claim 1 that further comprises a modified polyolefin.

7. The resin composition according to claim 6, wherein a content of the modified polyolefin is from 1 part by weight to 50 parts by weight with respect to 100 parts by weight of the terminal modified resin.

8. A resin molded article comprising:
a thermoplastic resin;
a carbon fiber; and
a terminal modified resin comprising a main chain having at least one terminal modified with a long chain alkyl group having 8 or more carbon atoms, the main chain comprising at least one of an amide bond and an imide bond
wherein an average length of the carbon fiber is from 0.1 mm to 5.0 mm.

9. The resin molded article according to claim 8, wherein the thermoplastic resin is a polyolefin.

10. The resin molded article according to claim 8, wherein the terminal modified resin is a polyamide comprising the amide bond in a main chain.

11. The resin molded article according to claim 8, wherein a content of the terminal modified resin is from 0.1 part by weight to 100 parts by weight with respect to 100 parts by weight of the thermoplastic resin.

12. The resin molded article according to claim 8, wherein a content of the terminal modified resin is from 0.1% by weight to 200% by weight with respect to a weight of the carbon fiber.

13. The resin molded article according to claim 8 that further comprises a modified polyolefin.

14. The resin molded article according to claim 13, wherein a content of the modified polyolefin is from 0.1 part by weight to 50 parts by weight with respect to 100 parts by weight of the thermoplastic resin.

15. The resin molded article according to claim 13, wherein a content of the modified polyolefin is from 1 part by weight to 50 parts by weight with respect to 100 parts by weight of the terminal modified resin.

16. A resin composition comprising:
a thermoplastic resin;
a carbon fiber; and
a terminal modified resin comprising a main chain having at least one terminal modified with a sterol residue, the main chain comprising at least one of an amide bond and an imide bond.

17. The resin composition according to claim 16, wherein an average length of the carbon fiber is from 0.1 mm to 5.0 mm.

18. The resin composition according to claim 16, wherein the thermoplastic resin is a polyolefin.

19. The resin composition according to claim 16, wherein the terminal modified resin is a polyamide comprising the amide bond in a main chain.

20. The resin composition according to claim 16, wherein a content of the terminal modified resin is from 0.1 part by weight to 100 parts by weight with respect to 100 parts by weight of the thermoplastic resin.

21. The resin composition according to claim 16, wherein a content of the terminal modified resin is from 0.1% by weight to 200% by weight with respect to a weight of the carbon fiber.

22. The resin composition according to claim 16 that further comprises a modified polyolefin.

23. The resin composition according to claim 22, wherein a content of the modified polyolefin is from 1 part by weight to 50 parts by weight with respect to 100 parts by weight of the terminal modified resin.

24. A resin molded article comprising:
a thermoplastic resin;
a carbon fiber; and
a terminal modified resin comprising a main chain having at least one terminal modified with a sterol residue, the main chain comprising at least one of an amide bond and an imide bond.

25. The resin molded article according to claim 24, wherein an average length of the carbon fiber is from 0.1 mm to 5.0 mm.

26. The resin molded article according to claim 24, wherein the thermoplastic resin is a polyolefin.

27. The resin molded article according to claim 24, wherein the terminal modified resin is a polyamide comprising the amide bond in a main chain.

28. The resin molded article according to claim 24, wherein a content of the terminal modified resin is from 0.1 part by weight to 100 parts by weight with respect to 100 parts by weight of the thermoplastic resin.

29. The resin molded article according to claim 24, wherein a content of the terminal modified resin is from 0.1% by weight to 200% by weight with respect to a weight of the carbon fiber.

30. The resin molded article according to claim 24 that further comprises a modified polyolefin.

31. The resin molded article according to claim 30, wherein a content of the modified polyolefin is from 1 part by weight to 50 parts by weight with respect to 100 parts by weight of the terminal modified resin.

* * * * *